(12) United States Patent
Austin et al.

(10) Patent No.: US 11,704,483 B2
(45) Date of Patent: *Jul. 18, 2023

(54) GENERATING CUSTOM APPLICATION LINKS

(71) Applicant: Branch Metrics, Inc., Redwood City, CA (US)

(72) Inventors: Alexander Austin, Palo Alto, CA (US); William Lindemann, Palo Alto, CA (US); Cheng-chao Yang, Palo Alto, CA (US); Eric J. Glover, Palo Alto, CA (US); Dmitri Gaskin, Albany, CA (US); Kan Yu, San Mateo, CA (US); Sofus Macskassy, Palo Alto, CA (US)

(73) Assignee: Branch Metrics, Inc., Palo Alto, CA (US)

( * ) Notice: Subject to any disclaimer, the term of this patent is extended or adjusted under 35 U.S.C. 154(b) by 327 days.

This patent is subject to a terminal disclaimer.

(21) Appl. No.: 16/998,479

(22) Filed: Aug. 20, 2020

(65) Prior Publication Data

US 2020/0380203 A1 Dec. 3, 2020

Related U.S. Application Data

(63) Continuation of application No. 16/003,643, filed on Jun. 8, 2018, now Pat. No. 10,769,364.

(Continued)

(51) Int. Cl.
*G06F 17/00* (2019.01)
*G06F 40/186* (2020.01)
(Continued)

(52) U.S. Cl.
CPC ........ *G06F 40/186* (2020.01); *G06F 16/9535* (2019.01); *G06F 40/134* (2020.01)

(58) Field of Classification Search
CPC ... G06F 40/186; G06F 16/9535; G06F 40/134
See application file for complete search history.

(56) References Cited

U.S. PATENT DOCUMENTS 7,769,767 B2 8/2010 Petersen
8,954,836 B1 2/2015 Look et al.
(Continued)

OTHER PUBLICATIONS

Azim, Tanzirul, Oriana Riva, and Suman Nath. "uLink: Enabling user-defined deep linking to app content." Proceedings of the 14th Annual International Conference on Mobile Systems, Applications, and Services. 2016 (Year: 2016).*

(Continued)

*Primary Examiner* — Andrew T McIntosh
(74) *Attorney, Agent, or Firm* — RMCK Law Group PLC

(57) ABSTRACT

A method includes receiving a request from a user device accessing a webpage, the request including a webpage uniform resource locator (URL) and a user device identifier. The method includes retrieving a list of events associated with the user device based on the device identifier. The method further includes retrieving sets of rules. Each set of rules indicates events and URLs that satisfy the set of rules. Each set of rules is associated with a template that includes link rendering data for rendering a link on the user device. The method includes identifying a set of rules that is satisfied by the received URL and events, transmitting link rendering data associated with the identified set of rules to the user device, and transmitting link routing data to the user device. The link routing data is configured to route the user device to an application state corresponding to the webpage.

22 Claims, 11 Drawing Sheets

Related U.S. Application Data

(60) Provisional application No. 62/517,230, filed on Jun. 9, 2017.

(51) Int. Cl.
  *G06F 16/9535* (2019.01)
  *G06F 40/134* (2020.01)

(56) References Cited

U.S. PATENT DOCUMENTS

| | | |
|---|---|---|
| 2014/0129733 A1 | 5/2014 | Klais |
| 2014/0214916 A1 | 7/2014 | Gokul |
| 2014/0250106 A1 | 9/2014 | Shapira et al. |
| 2015/0156061 A1 | 6/2015 | Saxena et al. |
| 2016/0055133 A1 | 2/2016 | Look et al. |
| 2016/0142858 A1 | 5/2016 | Molinet et al. |
| 2017/0132024 A1 | 5/2017 | Desineni et al. |
| 2017/0192941 A1 | 7/2017 | Glover et al. |

OTHER PUBLICATIONS

Ma, Yun, et al. "DroidLink: Automated generation of deep links for Android apps." arXiv preprint arXiv:1605.06928 (2016). (Year: 2016).*

Advertising ID—Developer Console Help, Internet Archive—Wayback Machine, https://web.archive.org/web/20161217180225/https://support.google.com/googleplay/android-developer/answer/6048248?hl=en, dated Dec. 17, 2016, accessed on Aug. 6, 2018, 2 pages.

Apple IDFA: A Primer for Marketers, https://apsalar.com/2015/06/all-about-idfa/, dated Jun. 30, 2015, accessed on Aug. 6, 2018, 4 pages.

Friedenthal, A., "5 Lessons Learned in Site Retargeting," website archived on Dec. 23, 2017, https://web.archive.org/web/20171223134610/https://www.softwareadvice.com/resources/5-lessons-learned-site-retargeting/, accessed on Aug. 28, 2018, 4 pages.

HTTP cookie from Wikipedia, Internet Archive—Wayback Machine, https://web.archive.org/web/20161231030710/https://en.wikipedia.org/wiki/HTTP_cookie dated Dec. 31, 2016, accessed on Aug. 6, 2018, 18 pages.

PCT International Search Report and Written Opinion dated Jul. 26, 2018 for PCT International Application No. PCT/US2018/031375, 12 pages.

Wikipedia, "Behavioral retargeting," website archived on May 26, 2017, https://web.archive.org/web/20170526165029/https://en.wikipedia.org/wiki/Behavioral_retargeting, accessed on Aug. 28, 2018, 2 pages.

Wikipedia, "Dynamic Creative," website archived on Nov. 21, 2016, https://web.archive.org/web/20161121151105/https://en.wikipedia.org/wiki/Dynamic_creative, accessed on Aug. 28, 2018, 1 page.

Wikipedia, "Site retargeting," website archived on Mar. 27, 2017, https://web.archive.org/web/20170327080616/https://en.wikipedia.org/wiki/Site_retargeting, accessed on Aug. 28, 2018, 1 page.

\* cited by examiner

GENERATING CUSTOM APPLICATION LINKS

CROSS-REFERENCE TO RELATED APPLICATIONS

This application is a continuation of U.S. application Ser. No. 16/003,643, filed on Jun. 8, 2018, which claims the benefit of U.S. Provisional Application No. 62/517,230, filed on Jun. 9, 2017. The disclosures of each of the above applications are incorporated herein by reference in their entirety.

FIELD

The present disclosure relates to providing linking functionality across multiple computing platforms.

BACKGROUND

Software developers can develop websites and applications that are accessed by users on a variety of different platforms, such as different computing devices and operating systems. Example websites/applications may include e-commerce applications, social media applications, and business review applications. In some cases, the websites and applications can include similar content. Some software developers may want to persuade users to download and use their application, as their application may provide a more custom/advanced user experience than their website. For similar reasons, developers may want to direct users into their application from other locations, such as their website or other websites. Developers may acquire analytics regarding the acquisition and usage of their websites and applications so that they can gain a better understanding of how their application is acquired and used on the different platforms.

SUMMARY

In one example, the present disclosure is directed to a method comprising receiving, at a computing device, a custom link request from a user device accessing a webpage, the custom link request including a uniform resource locator (URL) of the webpage and a device identifier that uniquely identifies the user device. The method comprises retrieving a list of events associated with the user device based on the device identifier. Each of the events identifies a user action taken on the user device. The method further comprises retrieving sets of template rules. Each set of template rules 1) indicates one or more events that satisfy the set of template rules, 2) indicates one or more URLs that satisfy the set of template rules, and 3) is associated with a custom link template that includes custom link rendering data for rendering a custom link on the user device. The method further comprises identifying a set of template rules that is satisfied by the received URL and the received list of events associated with the user device. The method further comprises transmitting custom link rendering data associated with the identified set of template rules to the user device. Additionally, the method comprises transmitting custom link routing data to the user device, the custom link routing data configured to route the user device to an application state corresponding to the webpage in response to user selection of the custom link rendered from the transmitted custom link rendering data.

In one example, the present disclosure is directed to a system comprising one or more storage devices and one or more processing units. The one or more storage devices are configured to store computer-readable instructions. The one or more processing units are configured to execute the computer-readable instructions. The computer-readable instructions cause the one or more processing units to receive a custom link request from a user device accessing a webpage, the custom link request including a URL of the webpage and a device identifier that uniquely identifies the user device. The computer-readable instructions further cause the one or more processing units to retrieve a list of events associated with the user device based on the device identifier and retrieve sets of template rules. Each of the events identifies a user action taken on the user device. Each set of template rules indicates one or more events that satisfy the set of template rules and indicates one or more URLs that satisfy the set of template rules. Each set of template rules is associated with a custom link template that includes custom link rendering data for rendering a custom link on the user device. The computer-readable instructions further cause the one or more processing units to identify a set of template rules that is satisfied by the received URL and the received list of events associated with the user device. The computer-readable instructions further cause the one or more processing units to transmit custom link rendering data associated with the identified set of template rules to the user device and transmit custom link routing data to the user device. The custom link routing data is configured to route the user device to an application state corresponding to the webpage in response to user selection of the custom link rendered from the transmitted custom link rendering data.

BRIEF DESCRIPTION OF THE DRAWINGS

The present disclosure will become more fully understood from the detailed description and the accompanying drawings.

DETAILED DESCRIPTION

Figure 1:
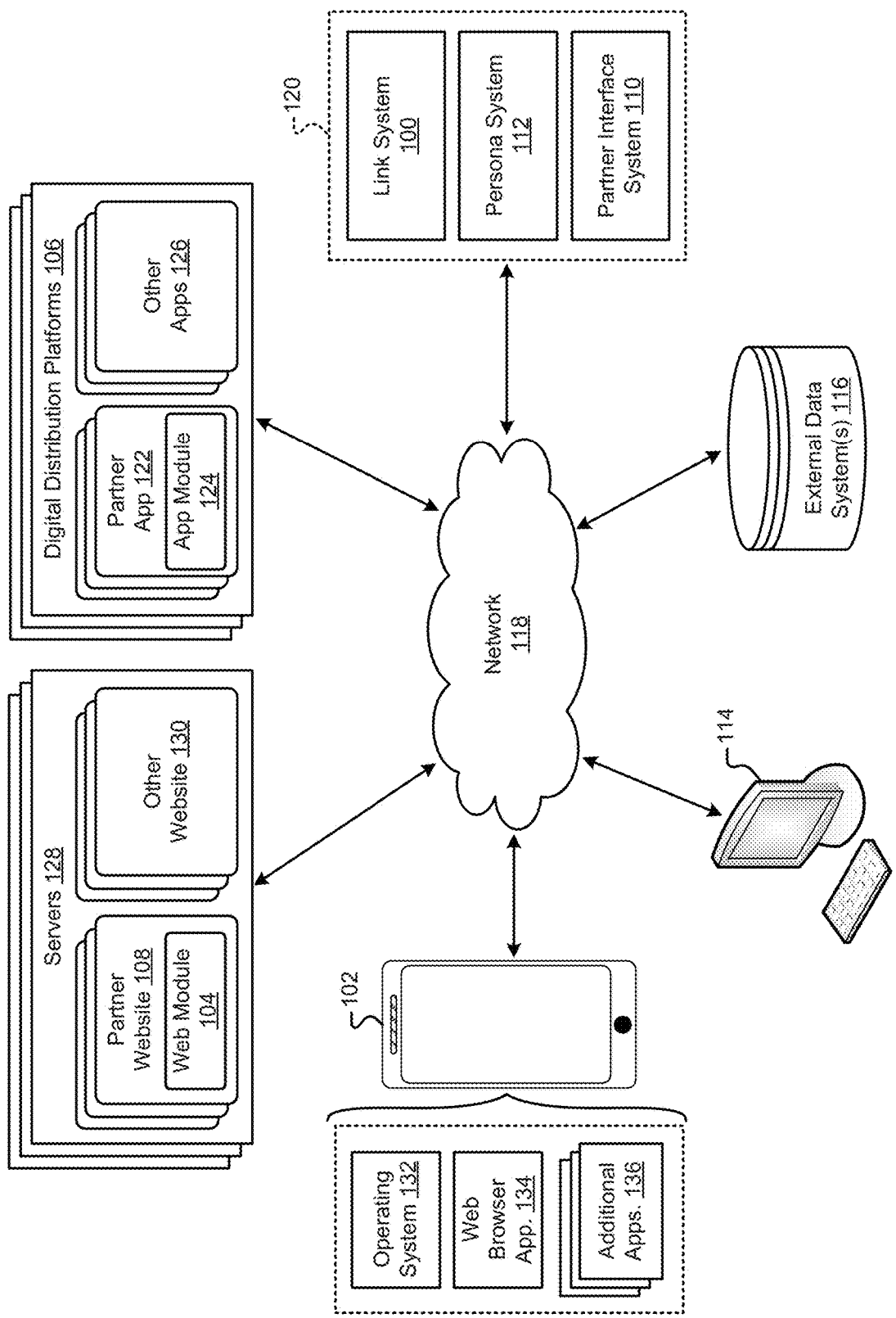
FIG. 1 illustrates an environment that includes a custom-link system in communication with a user device, a partner device, and external data systems.

A link system 100 of the present disclosure is configured to lead a user from a webpage to a corresponding state of an application installed on the user's device 102. The link system 100 includes a server that is remotely located from the user device 102. When the user device 102 accesses a webpage, a web module 104 (e.g., browser executed code) included on the webpage may cause the user device 102 to communicate with the link system 100 and display a custom link to the user viewing the webpage (e.g., see FIG. 4A). The user may select (e.g., click/touch) the custom link to access an application state corresponding to the currently viewed webpage.

In cases where the application is not installed on the user device 102, selection of the custom link may cause the user device 102 to access a digital distribution platform 106 for downloading the application. After installation of the application, the link system 100 may route the application to the application state corresponding to the webpage on which the custom link was located. In some cases, the application may provide an improved user experience relative to the website browsing experience (e.g., improved design and responsiveness). The improved user experience of a tailored application may incentivize users to spend more time in the application, view more products, and complete a greater number of purchases within the application relative to the website.

The owner/operator of the link system 100 may provide custom linking functionality described herein for a variety of different partners. The partners may operate websites and corresponding applications that include similar content. The website content and similar application content may be accessed using a web browser application and/or the partner's specific application installed the user device 102. Example similar content may include, but is not limited to, pages including products for sale, services for sale, hotel/room accommodations, music, images/videos, blog posts, news articles, and discounts/promotions.

Partners can include the web module 104 on their website 108 and also configure operation of the link system 100 in order to implement custom links for their web content. For example, the partner can include the web module 104 on specific pages of the partner's website 108 or across the entire partner website 108. The user device 102 transmits data to the link system 100 when accessing a webpage including the web module 104. Using a partner interface system 110 (e.g., FIG. 5), the partner may configure the custom links along with targeting rules that determine when the custom links are displayed.

When the user device 102 accesses a partner webpage, the user device 102 may make one or more requests to the link system 100 (referred to herein as "custom link requests"). Custom link requests may include a variety of different types of data. For example, the custom link requests may include device/browser metadata (e.g., user agent data). Example device/browser metadata may include, but is not limited to, a device identifier (e.g., a web cookie), an internet protocol (IP) address, operating system (OS) identification data (e.g., OS name, OS version), user device type, and user device screen resolution. Custom link requests may also include a current web uniform resource locator (URL) of the current webpage and/or a referrer URL indicating the address of the webpage used to access the current webpage (e.g., a referring search engine page or other webpage). In some cases, custom link requests may include webpage data extracted from the webpage according to the web module 104.

The link system 100 may process the received custom link request(s) 202 and provide one or more custom link responses 204 to the received request(s). For example, the link system 100 may determine if targeting rules for a custom link are satisfied based on the data received in the custom link request(s). In some implementations, targeting rules can include user history rules that can be satisfied based on a user's website browsing history and/or application usage (e.g., whether a user has visited a particular application/website). To determine whether user history rules are satisfied, the link system 100 can access user historical data stored in a persona system 112 (e.g., FIG. 6). Such user historical data may include lists of application events and web events indicating a user's web browsing history and application usage for the partner's website/application and other websites/applications (e.g., see persona data object of FIG. 8B).

If the custom link request(s) include data that satisfies the partner defined targeting rules, the link system 100 may generate one or more custom link responses that the user device 102 can use to render a custom link. The custom link data transmitted to a user device may include custom link rendering data used to render the custom link and custom link routing data used to access the corresponding application state.

User selection of the custom link can cause the user device 102 to access an application state including application content corresponding to the current webpage content, assuming the application is installed on the user device 102. Otherwise, selection of the custom link may cause the user device 102 to be routed to a digital distribution platform 106 to download the application. Upon opening the application after installation, the application may access the application state including the corresponding application content with routing assistance from the link system 100.

Figure 2:
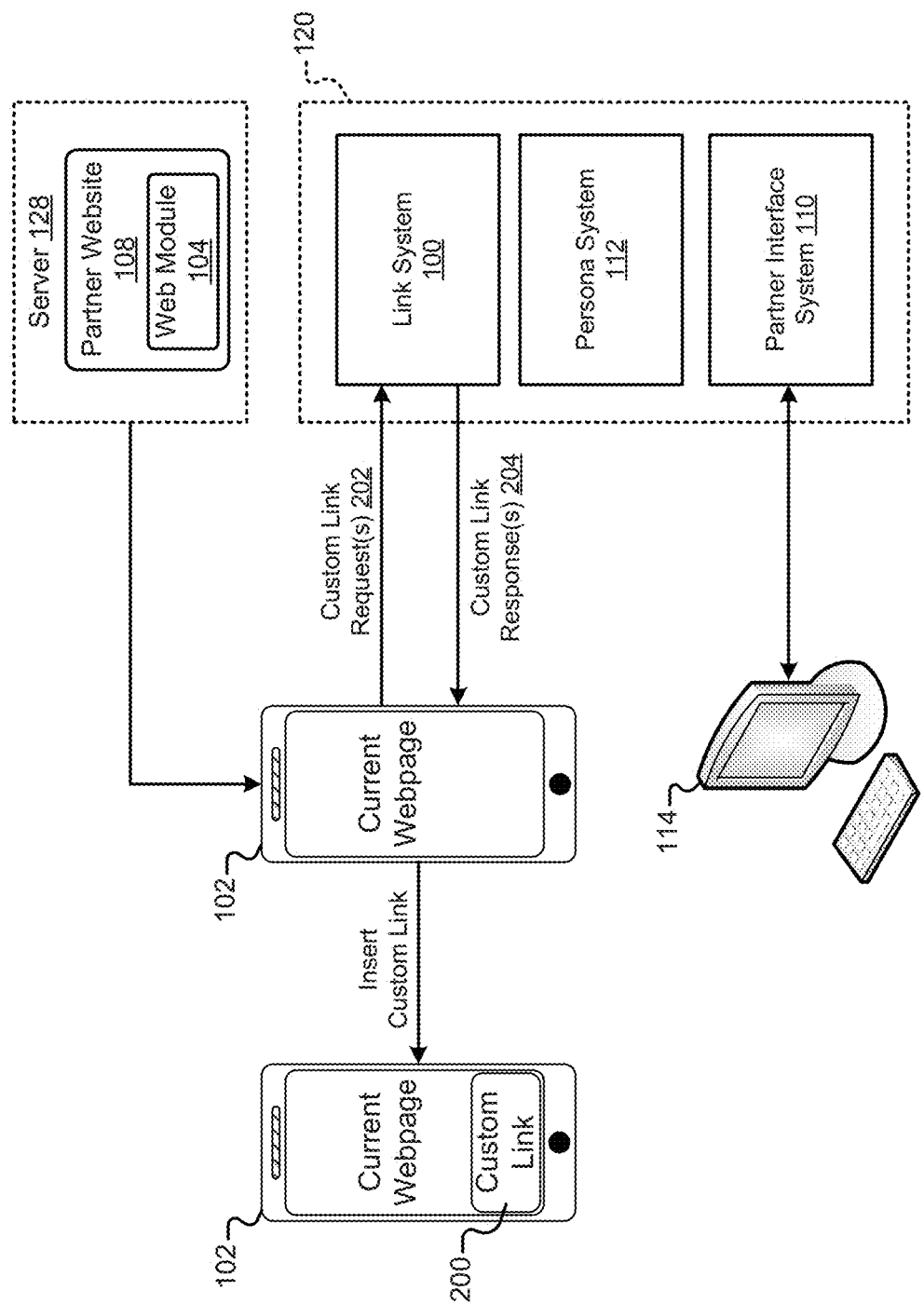
FIG. 2 illustrates a user device in communication with a partner website and the custom-link system.
Figure 3:
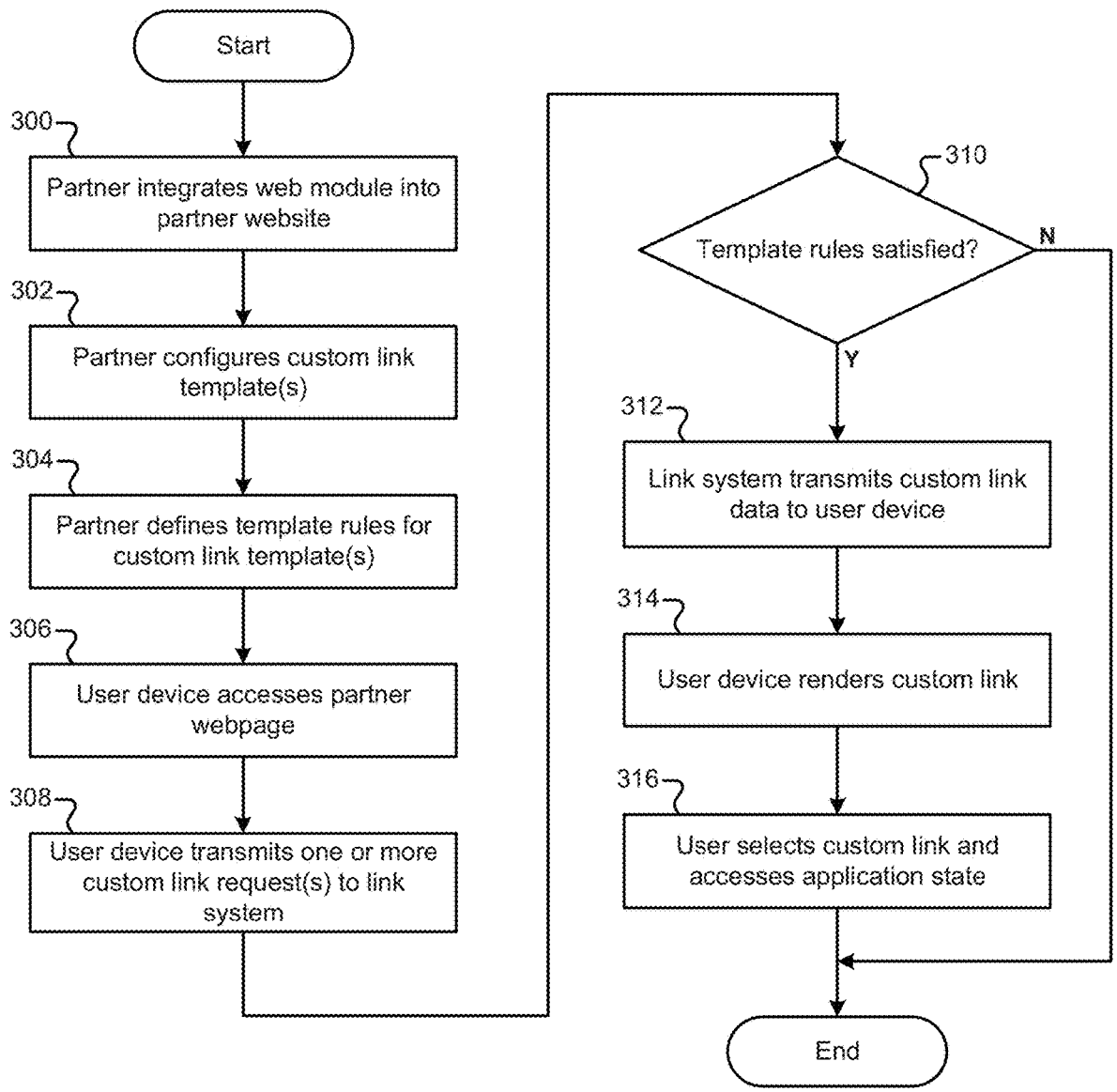
FIG. 3 illustrates a method describing interaction between the custom-link system, partners, and a user device.
Figure 4:
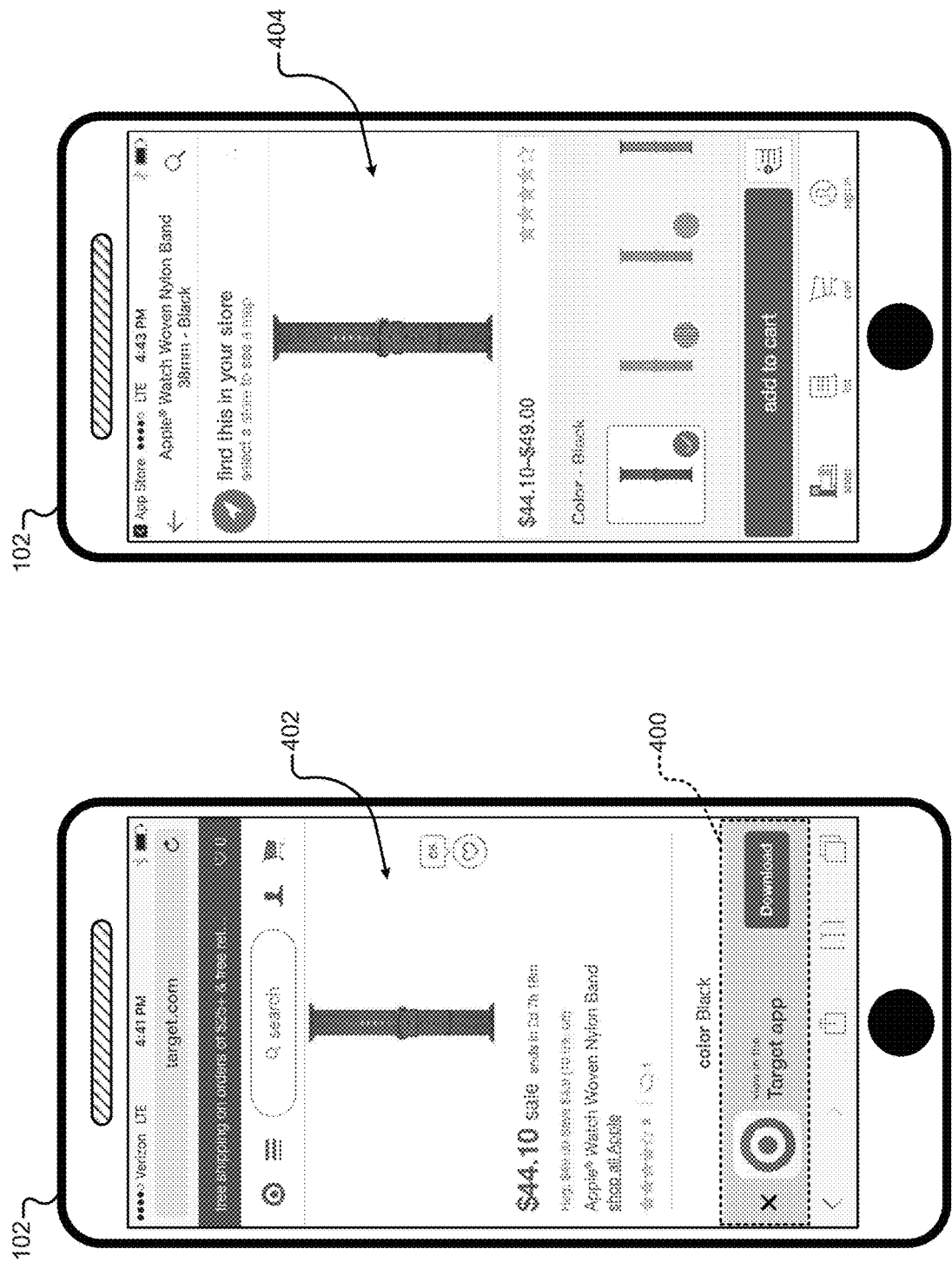
FIGS. 4A-4B illustrate example graphical user interfaces (GUIs) including a custom link and an application state accessed by the custom link.
Figure 5:
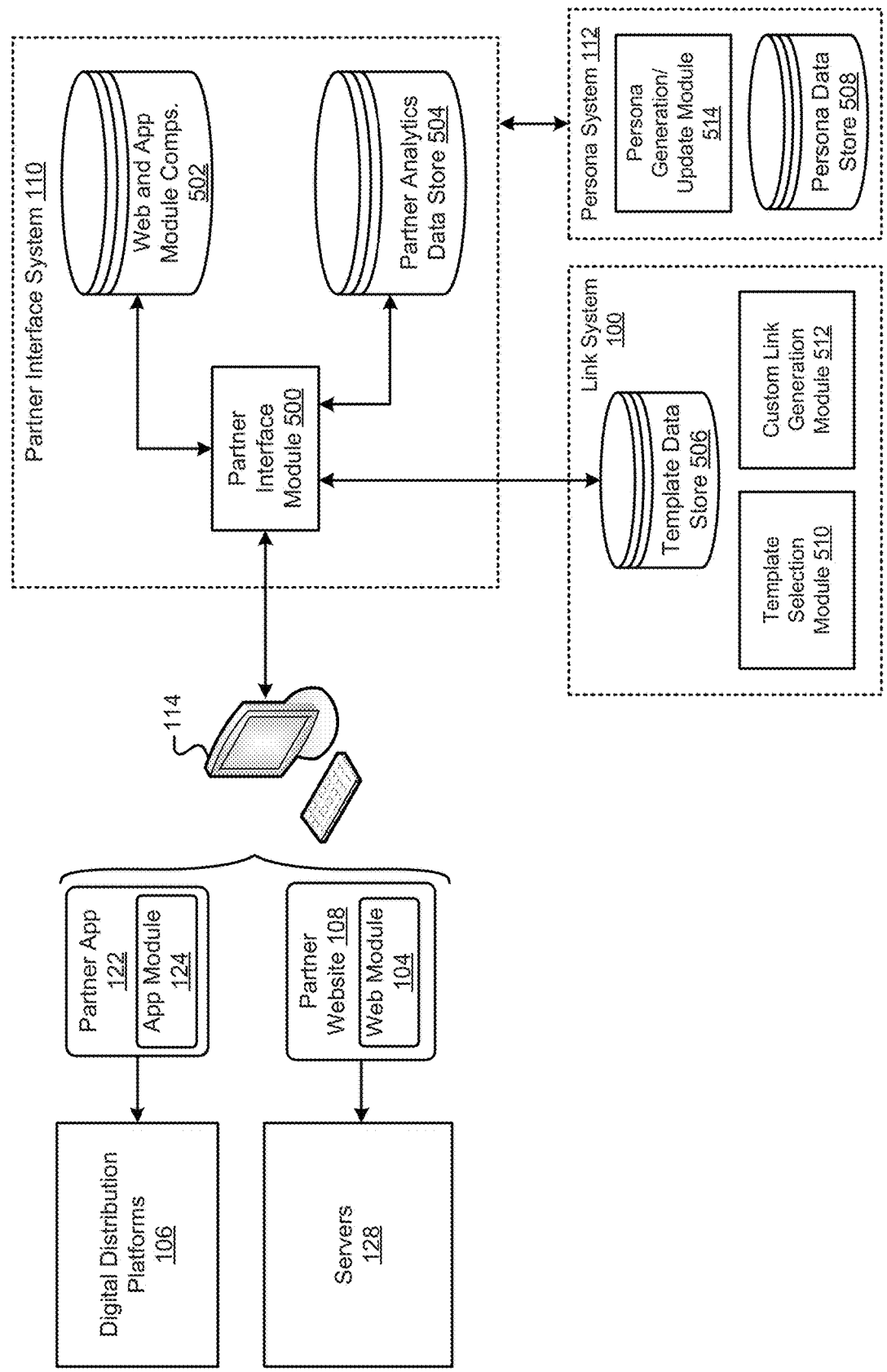
FIG. 5 illustrates a partner integrating with the link system in order to implement custom linking functionality.
Figure 8:
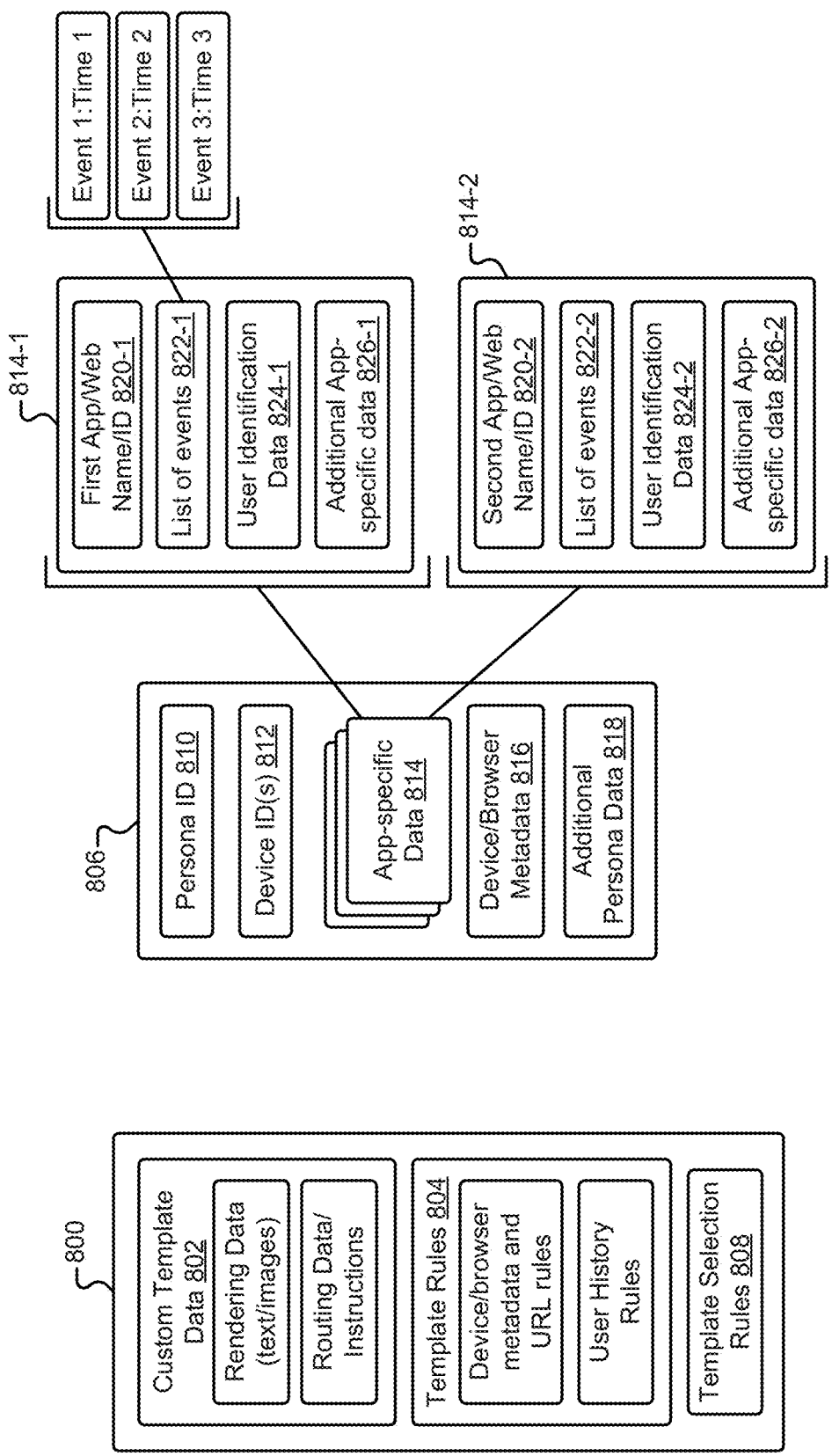
FIG. 8A illustrates an example partner template data object including custom template data and associated template rules.
FIG. 8B illustrates an example persona data object.

FIGS. 1-3, FIGS. 6-7, and FIGS. 9-11 illustrate features of an example link system 100, persona system 112, and partner interface system 110 in communication with a partner device 114, a user device 102, and an external data system 116. FIG. 4A illustrates an example graphical user interface (GUI) including a custom link 400 rendered over top of a current webpage 402. FIG. 4B illustrates an example corresponding application state 404 accessed via selection of the custom link 400 of FIG. 4A. FIG. 5 illustrates a partner integrating with the link system 100 in order to implement custom linking functionality. FIG. 8A illustrates an example partner template data object 800 including custom template data 802 and associated template rules 804. FIG. 8B illustrates an example persona data object 806.

FIG. 1 illustrates an example environment including a link system 100, a persona system 112, and a partner interface system 110 in communication with a partner device 114, a user device 102, and an external data system 116 via a network 118. The network 118 may include various types of computer networks, such as a local area network (LAN), wide area network (WAN), and/or the Internet.

In some implementations, a single party (e.g., a business) can own/operate the link system 100 and the persona system 112. In these implementations, the single party can provide the functionality of the link system 100 and the persona system 112 to various partners via a partner interface system 110. The link system 100, persona system 112, and partner interface system 110 operated by a single party for use by one or more partners may be collectively referred to as a "custom-link system" 120 (e.g., illustrated as a broken line in FIG. 1). Although the link system 100, persona system 112, and partner interface system 110 may be operated by a single party for use by one or more partners, in some cases, the various systems of the custom-link system 120 may be operated by different parties.

An example partner is represented by the partner computing device 114 (hereinafter "partner device 114") that the partner may use to communicate with the partner interface system 110. An example partner may be a business that has a website and a corresponding mobile application. The partner (e.g., business) may integrate with the custom-link system 120 in order to add custom linking functionality to their website/application. The partners may communicate with the partner interface system 110 in order to integrate with the custom-link system 120 and retrieve data from the custom-link system 120. For example, the partner may interface with the partner interface system 110 using a dashboard (e.g., a web-based dashboard interface) and/or an application programming interface (API) provided by the partner interface system 110. Although a single partner device is illustrated, a plurality of partner devices associated with a plurality of different partners may communicate with the custom-link system 120.

The partner can integrate with the custom-link system 120 in a variety of ways. For example, the partner can retrieve application and web module components that the partner can modify and include into their application(s) and website(s). The application and web module components can include computer code that provides features for communicating with the custom-link system 120. As another example, the partners can configure operation of the custom-link system 120 via the partner interface system 110 for their purposes. For example, the partners can configure one or more custom link templates and corresponding template rules for delivering custom links to users.

The environment includes one or more digital distribution platforms 106. The digital distribution platforms 106 represent computing systems that are configured to distribute applications to user devices. Example digital distribution platforms include, but are not limited to, the GOOGLE PLAY® digital distribution platform by Google, Inc. and the APP STORE® digital distribution platform by Apple, Inc. The digital distribution platforms 106 include one or more partner applications 122, each of which may include an application module 124. The application module 124 may operate to route a user to the corresponding application state after installation of the application, as described herein. The digital distribution platforms 106 also include a plurality of applications 126 developed by parties other than the partners. Users may download the applications from the digital distribution platforms 106 and install the applications on user devices.

The environment includes a plurality of servers 128 (e.g., web servers). The servers 128 serve websites (or web applications) to the user devices 102. In some implementations, the servers 128 serve partner websites 108 to the user devices 102. A partner website 108 may include a web module 104 that has been configured by the partner. The partner website 108 may be in a variety of formats, such as a full website, a mobile website optimized for mobile devices, or other format (e.g., an accelerated mobile page). The servers 128 may also serve other websites 130 (e.g., other than those operated by the partners).

The user device 102 includes an operating system 132 and a plurality of applications, such as a web browser application 134 and additional applications 136 (e.g., partner applications 122 and/or other applications 126). Example additional applications 136 may include, but are not limited to, e-commerce applications, social media applications, business review applications, banking applications, gaming applications, and weather forecast applications. Using the web browser 134, the user device 102 can access various websites on the servers 128 via the network 118. The user device 102 can also download applications from the digital distribution platforms 106 via the network 118 and install the applications 136.

The environment includes one or more external data systems 116. The external data systems 116 represent computing systems that provide event data ("external event data") to the persona system 112. The external event data may include user historical data that is received/stored by the persona system 112 and used to determine when to show a custom link to the user. The external event data may be provided by parties other than the partners and the operator of the custom-link system 120.

FIG. 2 illustrates a partner configuring the partner website 108 and the link system 100 for the delivery of custom links. Additionally, FIG. 2 illustrates a user device 102 accessing the partner website 108 and the link system 100. The user device 102 receives custom link data from the link system 100 and generates a custom link 200. FIG. 3 illustrates a method describing operation of the devices 102, 114 and systems 100, 110, 112 of FIG. 2. The operations illustrated in FIG. 2 are now described with respect to the method of FIG. 3.

Initially, in block 300, the partner integrates the web module 104 into the partner website 108. For example, the partner may retrieve web module components from the partner interface system 110, modify the web module components, and include the web module components in the partner website 108. The modified web module components included in the partner website 108 are illustrated as the web module 104 in FIGS. 1-2. The web module 104 may provide a variety of functionality related to the custom links. For example, the user device 102 may transmit one or more custom link requests 202 to the link system 100 according to the web module 104. Additionally, the user device 102 (e.g., the web browser application 134) may render a custom link 200 and handle user selection of the custom link 200 according to the web module 104.

In blocks 302-304, the partner may then interact with the partner interface system 110 to configure the link system 100 to deliver custom links. For example, in block 302, the partner may configure one or more custom link templates. The custom link templates may include custom link rendering data used by the user device to render a custom link (e.g., text/images). Example custom link rendering data may include HyperText Markup Language (HTML) and Cascading Style Sheets (CSS) code that the web browser application 134 uses to render the custom links. The custom links may be rendered in a variety of ways, such as within a webpage or as a banner overlaying the webpage (e.g., some/all of the webpage).

In some implementations, the partner can configure the custom links to include dynamic rendering data. The dynamic rendering data may be determined after the user accesses the webpage. The dynamic rendering data may be determined based on a variety of factors, which may include installation status of the application and the geographic region of the user (e.g., the user's likely language). For example, the custom link may include different text indicating whether selecting the custom link will cause the application to open (e.g., if the application is installed) or be installed at the user's discretion (e.g., if the application is not currently installed). As another example, the custom link may include text in different languages for different geographic locations of the user. The partner may configure the text to be displayed based on application installation status and geographic location. The user device 102 and/or the link system 100 may determine which dynamic rendering data to use when rendering the custom link.

In some implementations, the partner may configure custom links to include dynamic text. For example, the partner may configure a custom link to include some text taken from the current webpage. In one specific example, the partner may configure a custom link to include the name of a product included on the current webpage. In another specific example, the partner may configure a custom link to include the name of a sports team on a current webpage including sports content.

In block 304, the partner defines targeting rules for each of the custom link templates that define when the custom links are shown to a user. The targeting rules for a custom link template may be referred to herein as "template rules." Each custom link template can be associated with a set of template rules. The partner can generate multiple custom link templates, each of which is associated with a set of template rules. In some cases described herein, the partner can generate a single set of template rules for multiple custom link templates. In these cases, the link system 100 can select from the multiple custom link templates according to other partner defined parameters, such as template weighting values.

The template rules may include one or more conditions that, when satisfied, cause the link system 100 to transmit a custom link to the user device 102. Example template rules may be based on the device/browser metadata received by the link system 100. Additional example template rules may be based on the current webpage URL and/or the referrer URL. Additionally, template rules may be based on user historical data related to how the user (e.g., the user device) has used various websites and/or applications in the past. The user device 102 may be served custom links for the partner website 128 after the partner has configured the web module 104 and the link system 100 (e.g., generated custom link templates and template rules).

In block 306, the user device 102 accesses a webpage on the partner website 108. In block 308, in response to the user device 102 accessing the webpage, the user device 102 (e.g., according to the web module 104) transmits one or more custom link request(s) to the link system 100. For example, the user device 102 can transmit data used by the link system 100 to determine whether to show the user a custom link. Example data transmitted to the link system 100 may include, but is not limited to, the current URL, a referrer URL, and device/browser metadata.

In block 310, the link system 100 determines whether any template rules are satisfied based on the received data. If a set of template rules is satisfied for a custom link template, the link system 100 transmits custom link data associated with the custom link template to the user device 102 in block 312. The custom link data may include custom link rendering data (e.g., partially based on application installation status and/or geolocation) and custom link routing data.

The custom link routing data may include data and instructions that may be used by the user device 102 and/or the link system 100 to varying degrees to route the user device to the corresponding application state. In some implementations, if the application is not installed on the user device 102, the custom link routing data may route the user to the digital distribution platform 106 to download the application. Additionally, the user device 102 may be routed to the corresponding application state when the application is first opened after installation. In this manner, the user device 102 may be routed to a corresponding application state whether or not the application is installed at the time the custom link is rendered.

In block 314, the user device 102 renders the custom link 200 on the user device display based on the received custom link rendering data. The user device 102 may render the custom link in a variety of ways. For example, the user device 102 (e.g., web browser application 134) may render the custom link within the current webpage or as a banner overlaying the current webpage.

In block 316, the user selects (e.g., touches or clicks) the rendered custom link to access the application state corresponding to the current webpage. In some implementations, the custom link may include a GUI element (e.g., a button) for selecting the custom link. The custom link may also include a GUI element (e.g., an "x") or text (e.g., "continue to web") for closing the custom link. In some cases, the custom link directs the user to the digital distribution platform 106 for downloading the application if the application is not installed. Upon opening the application after installation, the application may retrieve additional routing data from the link system 100 that may be used for accessing the application state.

FIGS. 4A-4B illustrate example GUIs including a webpage 402, a rendered custom link 400, and an application state 404 corresponding to the webpage. The example user device 102 of FIG. 4A may be executing the IOS® operating system and accessing the webpage using the Safari web browser developed by Apple, Inc.

In FIG. 4A, the user has accessed a webpage on the Target Corporation website (e.g., on the domain target.com). The webpage is directed to an Apple® Watch Woven Nylon Band, which may be purchased on the website. Specifically, the webpage URL may be http://www.target.com/p/apple-watch-woven-nylon-band/-/A-51771353. The user device 102 (e.g., the web browser application 134) has generated a custom link 400 as an overlay that is rendered at the bottom of the webpage over the webpage content. The custom link 400 includes text (e.g., "view in the Target app" and "Download") and an image (e.g., the Target logo). The custom link 400 also includes GUI elements, such as a download button and an "x" GUI element that closes the custom link 400 (e.g., removes the custom link 400 from view). In some implementations, actions taken in response to selection of the GUI elements can be controlled by the partner. For example, the partner may configure the custom link to route the user to an alternate webpage in the case the user selects a GUI element that closes the custom link.

Note that the Download button GUI indicates to the user that selection of the custom link 400 (e.g., touching the Download button) may direct the user to the digital distribution platform 106 to download the Target application. As described herein, the link system 100 and/or the user device 102 may determine whether an application (e.g., the Target application) is installed prior to rendering the custom link. The link system 100 and/or the user device 102 may then insert text (e.g., button text) in the custom link according to whether the application is installed. Additionally, as described herein, the link system 100 and/or the user device 102 may modify behavior of the custom link based on whether the application is installed. For example, the custom link may access a digital distribution platform 106 or the application state in response to user selection of the custom link, depending on whether the application is installed.

In the case the Target application was installed on the user device 102, the custom link 400 may have indicated to the user that selection of the custom link would launch the application. For example, the Download text may be replaced with other text, such as "Open," that indicates the corresponding application state would be accessed using the Target application. The button text that is rendered based on application installation status may be selected by the partner when configuring how the link system 100 delivers custom links.

FIG. 4B illustrates an application state 404 (e.g., an application page) corresponding to the webpage 402 of FIG. 4A. Specifically, the application state 404 and webpage 402 are directed to the same product (the Apple® Watch Woven Nylon Band). The application state 404 may have been accessed after the application was downloaded and installed after selection of the custom link in FIG. 4A. As described with respect to FIG. 9, the link system 100 may direct an application to the corresponding application state after installation. In the case the Target application was installed, selection of the custom link 400 may have launched the application and set the application to the application state 404 illustrated in FIG. 4B without redirection to the digital distribution platform 106.

FIG. 5 illustrates how a partner may setup the custom link functionality with the link system 100 via the partner interface system 110. The partner interface system 110 includes a partner interface module 500, application and web module components 502, and a partner analytics data store 504. The partner interface module 500 provides functionality for interfacing with the partner interface system 110.

The partner interface module 500 may provide an interface for integrating with the link system 100. An example GUI provided by the partner interface module 500 may be referred to as a partner dashboard (not illustrated). The partner dashboard may include a web-based interface that includes a variety of GUI elements that assist the partner in configuring the link system 100 and retrieving data (e.g., analytics data) from the link system 100. Example GUI elements may include, but are not limited to, various data visualizations, spreadsheets, tables, graphs, selection elements (e.g., drop down boxes and menus), and text input boxes.

The partner may integrate with the link system 100 in any of the ways described herein via the partner interface module 500 (e.g., the partner dashboard). For example, the partner may retrieve the web module components and/or application module components via the partner interface module 500 (e.g., via the partner dashboard or via a website provided by the operator of the link system 100). The web module components may include software libraries and functions/methods that may be included in the partner's website 108. The functions/methods (e.g., JavaScript) may be invoked to provide the website with various functionalities described herein with respect to the link system 100. For example, the functions/methods may be invoked to send data to the link system 100, such as the device/browser metadata, the current URL, the referrer URL, and extracted webpage data. Additionally, the functions/methods may render the custom link and provide functionality for the GUI elements of the custom link. The integrated/modified web module components included in the partner's website may be referred to as a "web module 104."

The application module components may include software libraries and functions/methods that may be included in the partner's application 122. The functions/methods may be invoked to provide applications with various functionalities described herein with respect to the link system 100. For example, the functions/methods may be invoked by the partner application 122 to communicate with the link system 100 in order to provide custom link functionality. In one specific example, upon opening the application (e.g., after installation), the user device 102 may transmit an application open event to the link system 100. As described with respect to FIG. 9, in response to the application open event, the link system 100 may determine that the user device 102 had selected the custom link and installed the partner application. The link system 100 may then transmit data to the user device 102 that the partner application 122 (e.g., application module components) may use to access the application state corresponding to the webpage for which the custom link was displayed. The integrated/modified application module components included in the partner's application may be referred to as an "application module 124." The partner may upload the partner application 124 including the application module 124 to one or more digital distribution platforms 106.

The partner may also configure how the link system 100 will behave with respect to custom link requests. Initially, the partner can set up rendering data for the custom links (e.g., via the dashboard). In some implementations, the partner can be provided with predefined templates that the partner may modify using the dashboard. In other implementations, the partner can create their custom link rendering data without using the partner interface system 110, and then upload the rendering data via the partner interface system 110.

The rendering data may include text, such as a title, description, ratings, and number of views. The rendering data may also define text size, text color, text position, and background color in the custom links. The rendering data may also include one or more images (e.g., an application icon) to be rendered in the custom link. The rendering data may also indicate the location of the custom link when rendered. For example, the rendering data may indicate that the custom link should be displayed at the top or bottom of the display, and whether the custom link should remain in the same location or scroll with the webpage content. The rendering data may include HTML and CSS. In some implementations, the rendering data may include data/instructions for rendering the dynamic portions of the custom link.

In some examples, the partner may define dynamic properties of the custom links, such as the text to be included in the custom links. For example, the partner may define text indicating the installation status of the application (e.g., "install" or "open" the application). The partner may also define the text to be displayed based on the user's geographic location. For example, the partner may define alternative text in different languages, which may be used based on the user's geographic location. The dynamic properties may be stored in the rendering data. In some implementations, the rendering data may also include UI data indicating how the GUI elements (e.g., button GUI element and "x" GUI element) of the custom link should respond to user selection.

After generating one or more custom link templates, the partner can use the partner dashboard set the template rules for each of the custom link templates. The template rules may specify conditions that, when satisfied, cause the link system 100 to transmit custom link data to the user device 102 for rendering. The partner can specify a variety of different template rules described herein.

In some implementations, the partner may specify template rules that are based on the current webpage URL being accessed on the user device 102. For example, the partner may indicate which webpages on the partner's website 108 should show a custom link. In some cases, the partner may indicate that any of the webpages on the partner's website 108 should show custom links. In other cases, the partner may specify a subset of webpages on the partner website 108 that should display a custom link. For example, the partner may specify a domain/path on their website 108 for which custom links should be shown (e.g., specify a starting portion of a URL). In a specific example, the partner may specify that the user's current webpage should be included within product pages for the website in order to show a custom link (e.g., to drive product purchases to the application). Alternatively, the partner may specify portions of the website that should not show custom links. For example, the partner may add a flag to webpages that should not show custom links.

In some implementations, the partner may specify that specific query parameters should be included in the URL in order to show a custom link. The query parameters may be included in a query string that is part of the URL. For example, the query string may include fields that are added to a base URL (e.g., by a web browser or other application).

In some implementations, the partner may specify template rules that are based on the referrer site (e.g., the referrer URL) from which the user accessed the current webpage. For example, the partner may specify the referral URL at a web domain level or at a domain/path level.

In some implementations, the partner may specify a schedule that indicates when the custom links should be shown. For example, the partner may specify a range of dates for which custom links may be shown. Similarly, the partner may specify a range of dates for which custom links should not be shown.

In some implementations, the partner may include tags (e.g., words) on their website that are used for targeting. In these implementations, the partner may specify template rules that are based on the tags included in the currently viewed webpage. The tags may be used across the entire website or placed on portions of the website, such as webpages associated with a specific category. In a specific example, a media application may separate content into several different categories, such as sports and news. In this specific example, the website partner may tag the sports and news pages with the tags "sports" and "news" for use in custom link targeting.

In some implementations, the partner may specify template rules that are based on user historical data. For example, the partner may specify template rules that are based on whether the user has completed any events within the partner website/application 108, 122 and/or within other websites/applications. In some implementations, the partner can specify in the template rules that one or more events should have occurred a specific number of times. The partner may also specify that the event(s) should have occurred within a specified time window (e.g., during the last week or month). In some cases, the partner may specify that certain events should not have occurred in order to show the custom link. In some cases, the partner may specify periods of time for which the custom link should not be shown after a user dismisses the custom link. For example, the partner may specify that the custom link should not be shown for a period of a week after the user has dismissed the custom link. The sets of template rules may be stored along with the templates in the template data store 506 (e.g., as a partner template data object 800 illustrated in FIG. 8A).

The user's historical data may be stored in the persona system 112 (e.g., as a persona data object 806 of FIG. 8B, hereinafter "persona 806"). The link system 100 may access the persona system 112 to determine whether the user has completed events associated with the user history rules. Example web events and application events stored in the personas are described herein with respect to FIG. 8B. Example web events may include, but are not limited to, 1) a webpage view event, 2) a web commerce event (e.g., adding an item to a shopping cart or purchasing an item), 3) a custom link selection event, and 4) a custom event (e.g., defined by the partner). Example application events may include, but are not limited to, 1) an application open event, 2) an application close event, 3) an application commerce event (e.g., adding an item to a shopping cart or purchasing an item), 4) an application installation event, 5) an application reinstallation event, 6) an application page view event, and 7) custom events (e.g., defined by the partner).

The following are example sets of template rules that a partner may define based on user historical data. In one example, the partner may specify that a custom link should be shown if a user has the application installed. In another example, the partner may specify that a custom link should be shown if the user has visited the partner's website/application 108, 122 in general (e.g., a particular number of times over a period of time). In another example, the partner may specify that a custom link should be shown if the user has completed a web or application commerce event (e.g., added an item to their shopping cart or completed a purchase) in the partner's application 122 or website 108 within the last week. In another example, the partner may specify that a custom link should be shown if a user has selected an advertisement in the past (e.g., an advertisement on the web, application, or included in an email). The partner may generate a custom link template that corresponds to the template rules. The above template rules are only example template rules. As such, partners may define different template rules than those explicitly listed herein.

In another example, the partner may specify that a custom link should be shown if a user is viewing a specific portion of the website 108 (e.g., URLs within a specific domain/path on the website). In this example, the partner may specify that webpage URLs within the specific domain/path should be shown a specific custom link. Specifying a domain/path in the template rules may allow the partner to tailor custom link creative content to a user's currently viewed webpage. In one example, if the partner's website 108 and application 122 are directed to selling products to a user, the partner may specify that URLs associated with their promotional domain/path should show a promotional custom link including a promotional code that can later be redeemed in the application 122. Such a promotional code may be automatically accessed and applied by the application upon opening (e.g., described with respect to FIG. 9). In another example, if the partner's website 108 and application are directed to particular sports (e.g., baseball, basketball, hockey, etc.), the partner may specify that a domain/path associated with a particular team show custom links including content directed to that particular team.

The custom link templates and the corresponding template rules are stored in the template data store 506 of the link system 100. FIG. 8A illustrates an example partner template data object 800. The partner template data object 800 of FIG. 8A illustrates how custom template data 802 (e.g., rendering data and routing data) is associated with corresponding template rules 804. As discussed herein, the template rules 804 may include rules related to device/browser data, the current URL, and the referrer URL. Additionally, or alternatively, the template rules 804 may include user history rules (e.g., rules satisfied based on user historical data). The template data store 506 may store a plurality of such partner template data objects 800 for each partner. In some cases, the partner may define multiple custom templates for a single set of template rules. In these cases, the partner template data object 800 may include multiple sets of custom template data for the template rules.

The partner template data object 800 may also include template selection rules 808. The template selection rules 808 may include a priority value for the template. The priority values for the templates may indicate which template is to be shown in the case multiple sets of template rules 804 are satisfied. For example, if multiple sets of template rules 804 are satisfied (e.g., multiple templates may be shown), the link system 100 may select the template associated with the highest priority value.

In cases where there are multiple templates for the same set of template rules 804, the template selection rules 808 may include weighting values that indicate how often each of the templates should be selected relative to each other. The weighting values may be percentage values for each template that defines how often the template will be shown when the corresponding template rules 804 are satisfied. For example, if the partner creates two templates for a single set of template rules, the partner can define a first percentage value of 25% for the first template and a second percentage value of 75% for the second template. In this example, the link system 100 may select the first template 25% of the time the template rules are satisfied, and select the second template 75% of the time the template rules are satisfied. In other cases, the partner may specify that the templates for the single set of template rules be shown at random. In some implementations, the partner may specify a total percentage value of less than 100%, meaning that a custom link may not be shown for the remaining percentage. Varying which templates are used may allow the partner to A/B test the custom links against one another and against the website experience without custom links.

Referring back to FIG. 5, the partner interface system 110 includes an analytics data store 504 that stores partner analytics data. The partner device 114 may access (e.g., view/download) the partner analytics data via the partner dashboard. The partner analytics data may include data indicating how the custom links have been displayed and how the custom links have performed. For example, the analytics data may indicate which custom links were served and whether the custom links were selected by the user. The analytics data may be provided to the partner on a per-link basis. For example, the analytics data may indicate, for each custom link, which custom link was served and whether it was selected or closed. The analytics data may also be provided to the partner on an aggregate basis (e.g., number of custom links served and number selected/closed). The partner can evaluate performance of the custom links based on the retrieved analytics data (e.g., perform A/B testing). In some implementations, the partner can define analytics data associated with the custom links, such as metadata tags indicating a campaign name (e.g., advertising campaign), a channel on which the link will be shown (e.g., an app/website name), and/or a category associated with the custom link.

As described herein, the link system 100 may determine whether to show a custom link based on user historical data stored in the persona system 112. The user historical data is stored as a persona 806 in the persona data store 508. The persona system 112 and storage of the personas 806 in the persona data store 508 is now described with respect to FIG. 6 and FIG. 8B.

Over time, a user may take actions on the user device 102 that generate event data that may be stored in the persona data store 508. For example, event data may be generated when a user opens/closes an application, views a webpage, and/or selects links (e.g., hyperlinks) in an application or on a webpage. The generation and transmission of event data by the user device 102 in response to a user action may be referred to herein as an "event."

The persona system 112 may receive event data from a variety of different sources (e.g., user devices 102 and/or external data systems 116) and store the event data in personas 806. In some implementations, the web module 104 may be configured to generate event data (e.g., web event data) when the user takes actions in the web browser application 134. In other cases, the application module 124 may be configured to generate event data (e.g., application event data) when the user takes actions in the partner application 122. Accordingly, in some cases, the event data stored for a user may be generated by the web/application modules 104, 124 and stored in the persona system 112.

The persona system 112 may receive event data from sources other than the web/application modules 104, 124. For example, in some implementations, the persona system 112 may receive external event data from the external data systems 116 and store the external event data in personas 806. In some cases, the external data systems 116 may be provided by parties other than the partners and the operator of the link system 100. For example, the external data systems 116 may be operated by businesses that provide data management and analytics services (e.g., to the partners, the link system 100, and other parties). The external data systems 116 may collect additional data (e.g., in addition to the web/app modules 104, 124) regarding how users are using the partners' applications 122 and websites 108. In some cases, the partners may use the external data systems 116 to store event data and/or provide analytics. Example data management providers may include mParticle Inc. of New York, N.Y., and Segment Inc. of San Francisco, Calif. The external event data may include data associated with events that occur with respect to the partners' websites 108 and/or applications 122. Additionally, or alternatively, the external event data may be data associated with events that occur on websites and applications that are not operated by the partners. In some cases, the external event data may include event data that is otherwise not acquired via the web/app modules 104, 124. For example, the external data systems 116 may receive additional event data via modules incorporated into the partners' websites/applications 108, 122 by other parties (e.g., the operators of the external data systems 116). The persona system 112 may process and store external event data received from the external data systems 116 in a manner similar to event data received from the user devices 102.

The persona system 112 logs and processes received event data. For example, the persona generation/update module 514 (hereinafter "persona generation module 514") may log the event data by generating a new persona and/or updating an existing persona. In some implementations, the persona system 112 may perform matching operations on the generated/updated personas to determine whether the incoming event was generated by the same user device as a prior event. If the event data in two different personas was generated by the same user device, the data included in the personas may be merged together.

The event data received by the persona system 112 may include device identifiers (hereinafter "device IDs") that identify the user device that generated the event data. For example, device IDs may include a string of alphabetic, numeric, and/or symbolic characters (e.g., punctuation marks) that can be used to identify (e.g., uniquely identify) a user device among other user devices. The persona system 112 can use the various device IDs for tracking events (e.g., application installations, application opens, and webpage views).

Some device IDs may be associated with a web browser on a user device (e.g., set by a web browser). Device IDs associated with the web browser may be referred to herein as "web IDs." Example web IDs may include browser cookie IDs, which may be referred to as web cookies, internet cookies, or HTTP cookies.

Some device IDs may be associated with applications installed on the user device other than the web browser. In some cases, the device IDs may be operating system generated IDs that installed applications may access. Additional example device IDs may include advertising IDs, which may vary depending on the OS on the user device. Example advertising IDs may include Apple, Inc.'s identifier for advertising (IDFA) which may be used on devices running IOS®, or Google, Inc.'s Google Advertising ID (GAID) which may be used on devices running the ANDROID® OS. Another example device ID may be a hardware device ID (e.g., a unique device serial number). Although example device IDs described herein may include web device IDs, advertising IDs, and hardware IDs, other types of IDs can be used to uniquely identify a user device.

Each persona 806 may include data (e.g., a list of events) indicating how a person uses one or more user devices over time. For example, a single persona may include data indicating how a person uses a web browser and multiple applications on a single user device (e.g., a smartphone). In a more specific example, a single persona may include data indicating how a person interacts with a partner's website 108 and application 122. The persona system 112 may store one or more personas for each user device from which event data is received.

The persona generation module 514 updates existing personas in response to receiving event data associated with device IDs that are the same as device IDs included in existing personas. The persona generation module 514 may generate a new persona for each event associated with a new device ID (e.g., a new device ID not included in other personas). Since a single user device may generate multiple device IDs (e.g., web IDs and/or advertising IDs), the persona system 112 may store multiple personas for a single device. For example, the persona system 112 may store two personas associated with the same user device, where one persona is associated with a web ID (e.g., a browser cookie ID) and another persona is associated with another type of device ID (e.g., an advertising ID). The persona associated with the web ID may represent a user's web browsing on the user device (e.g., browsing on a partner's website and/or other websites). The persona associated with the advertising ID may represent the user's application usage on the user device (e.g., usage across multiple applications other than the web browser). For example, the persona associated with the advertising ID may represent usage of a partner's application and/or other applications on the user device. The persona system 112 can include matching functionality that identifies different personas (e.g., personas with different device IDs) that belong to the same user device. For example, the persona system 112 may match two personas based on data including, but not limited to, the IP addresses of the user devices, OS names, OS versions, device types, screen resolutions, and user identification data (e.g., a username). The persona system 112 may combine persona data (e.g., event data) from matching personas into a single persona.

FIG. 8B illustrates an example persona 806. Each persona 806 may include data related to a single user, such as a single user associated with one or more user devices. The persona 806 may include a persona ID 810 that can be assigned by the persona generation module 514 to uniquely identify the persona 806 among other personas in the persona data store 508. The persona 806 may also include one or more device IDs 812 (e.g., one or more web IDs and/or one or more advertising IDs).

The persona 806 includes one or more app-specific data structures 814-1, 814-2. The app specific data structures 814 include data that is specific to an application and/or website (e.g., specific to a partner's application and corresponding website). FIG. 8B illustrates two example app-specific data structures 814-1, 814-2 (e.g., for first and second apps/websites). The persona 806 may also include device/browser metadata 816 (e.g., user agent data), such as IP address, OS identification data (e.g., OS name, OS version), device type, and screen resolution.

The persona may also include additional persona data 818 including, but not limited to, geographic data associated with the user (e.g., a last geo-location associated with the user), a list of devices used by the user (e.g., one or more mobile devices and/or desktop devices), and additional data that may be derived from the app-specific data (e.g., the first time the user was seen, the last OS used, the last link selection event).

The app-specific data 814 for a single application may include data indicating how the user has used the application and/or the corresponding website. The app-specific data may include the application/website name/ID 820-1, 820-2. This ID identifies the application and/or corresponding website associated with the app-specific data. The app-specific data 814 may also include a list of events 822-1, 822-2 for the application/website. The list of events 822-1, 822-2 can include any of the application events and web events described herein, or other events. The events can be stored in a tuple format indicating the name of the event and a timestamp associated with the event (e.g., [name of event: timestamp]). In some implementations, the event data may include an event type indicator that indicates whether the event is a web or application event.

The app-specific data 814 can include user identification data 824-1, 824-2 (e.g., a username). In some implementations, the persona may be indexed by the combination of username and app ID. The app-specific data 814 can also include additional app-specific data 826-1, 826-2, some of which may be derived from the list of events for the app/website. Additional app-specific data may include, but is not limited to, a) a timestamp indicating the most recent usage of the app/website, b) a timestamp indicating the last time the app/website was accessed on a mobile device, c) a timestamp indicating the last time the app/website was accessed on a desktop device, d) activity data that indicates how often and when the app/website was used over a period of time (e.g., which days the app/website was used over a predetermined number of previous days), e) activity data that indicates how often the app/website was used on a mobile device, f) activity data that indicates how often the app/website was used on a desktop device, and g) a timestamp indicating the first time the user used the app/website (e.g., an earliest event in the list of events).

Application event data may be generated in response to a variety of different user actions. For example, application event data may be generated in response to: 1) an application being opened (referred to as an "application open event"), 2) the user closing the application (referred to as an "application close event"), 3) the user adding an item to a shopping cart or the user purchasing an item (referred to generally as "application commerce events"), 4) the user opening the application after installation (referred to as an "application installation event"), 5) the user opening the application after reinstallation (referred to as an "application reinstallation event"), 6) a user accessing a state of the application (e.g., an application page), and 7) the user performing any other action that the application module has been configured to report (e.g., a custom event defined by the partner). For example, a partner may define custom events to indicate that a specific application state (e.g., application page) or specific piece of content is viewed or shared. The application module 124 may be configured to generate a variety of different application events. As such, the above list of application events is only an example list of possible application events. In some implementations, the application module 124 may be configured to generate the above application events or different application events.

The application event data transmitted by the user device and stored in a persona may include, but is not limited to: 1) a device ID (e.g., an advertising ID, hardware ID, etc.), 2) an application name/ID (referred to herein as "app name/ID" or "app ID") that indicates the application with which the application event data is associated, 3) user identification data that identifies a user of the app (e.g., a username), 4) source data indicating the source of the event data, and 5) device/browser metadata. The application event data may also include an event identifier that indicates the type of event. For example, the event identifier may indicate whether the application event is an application open event, an application close event, an application installation event, an application reinstallation event, a commerce event (e.g., an add to cart event or a purchase event), or a custom event that may be defined by the developer in the application module 124.

Web event data may be generated in response to a variety of different user actions. For example, web event data may be generated in response to a user accessing a webpage (referred to as a "webpage view event"). Accessing a webpage may be the start of a web session (e.g., the first webpage access on the website) or a subsequent page view. Web event data may also be generated in response to the user adding an item to a shopping cart or the user purchasing an item (referred to generally as "web commerce events"). Web event data may also be generated in response to a user selecting a custom link (referred to as a "custom link selection event"). Additionally, web event data may be generated in response to the user performing any other action that the web module 104 has been configured to report (e.g., a custom web event defined by the partner). For example, a partner may define custom events to indicate that a specific webpage or specific piece of content is viewed or shared. The web module 104 may be configured to generate a variety of different web events. As such, the above list of web events is only an example list of possible web events. In some implementations, the web module 104 may be configured to generate the above web events or different web events.

The web event data transmitted by the user device and stored in a persona may include, but is not limited to: 1) a web ID, 2) the website name/ID, which may correspond to the app name/ID or app ID in the persona system 112, and 3) device/browser metadata. The device/browser metadata may be extracted from the user agent sent by the web browser. The web event data may also include user identification data that identifies a user of the website (e.g., a username), source data indicating the source of the event data, and an event identifier that indicates the type of event. For example, the event identifier may indicate whether the web event is a webpage view event, a commerce event, a sharing event, or a custom event defined by the developer in the web module.

Figure 6:
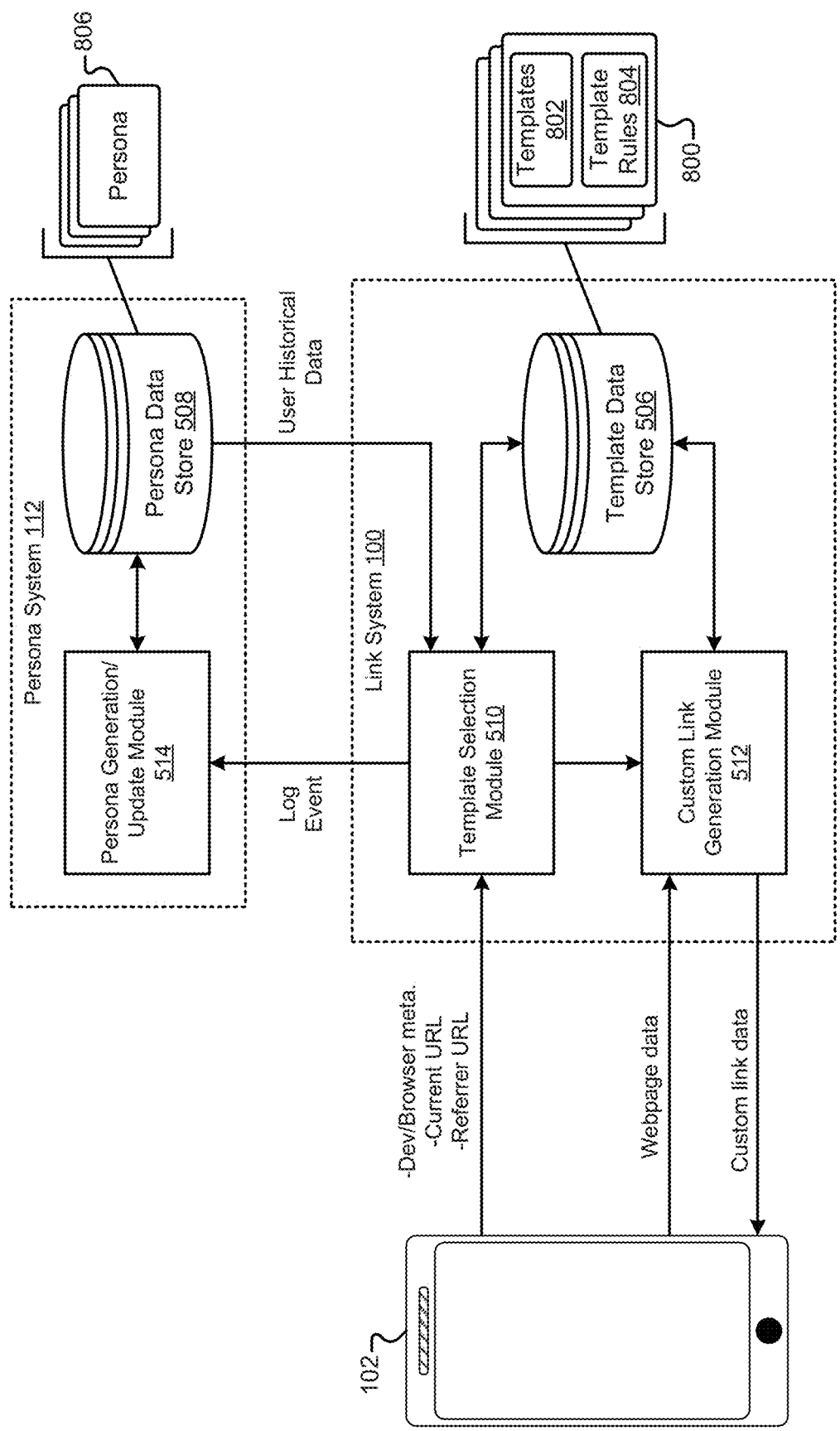
FIG. 6 is a functional block diagram that illustrates interaction between a user device and an example link system.
Figure 7:
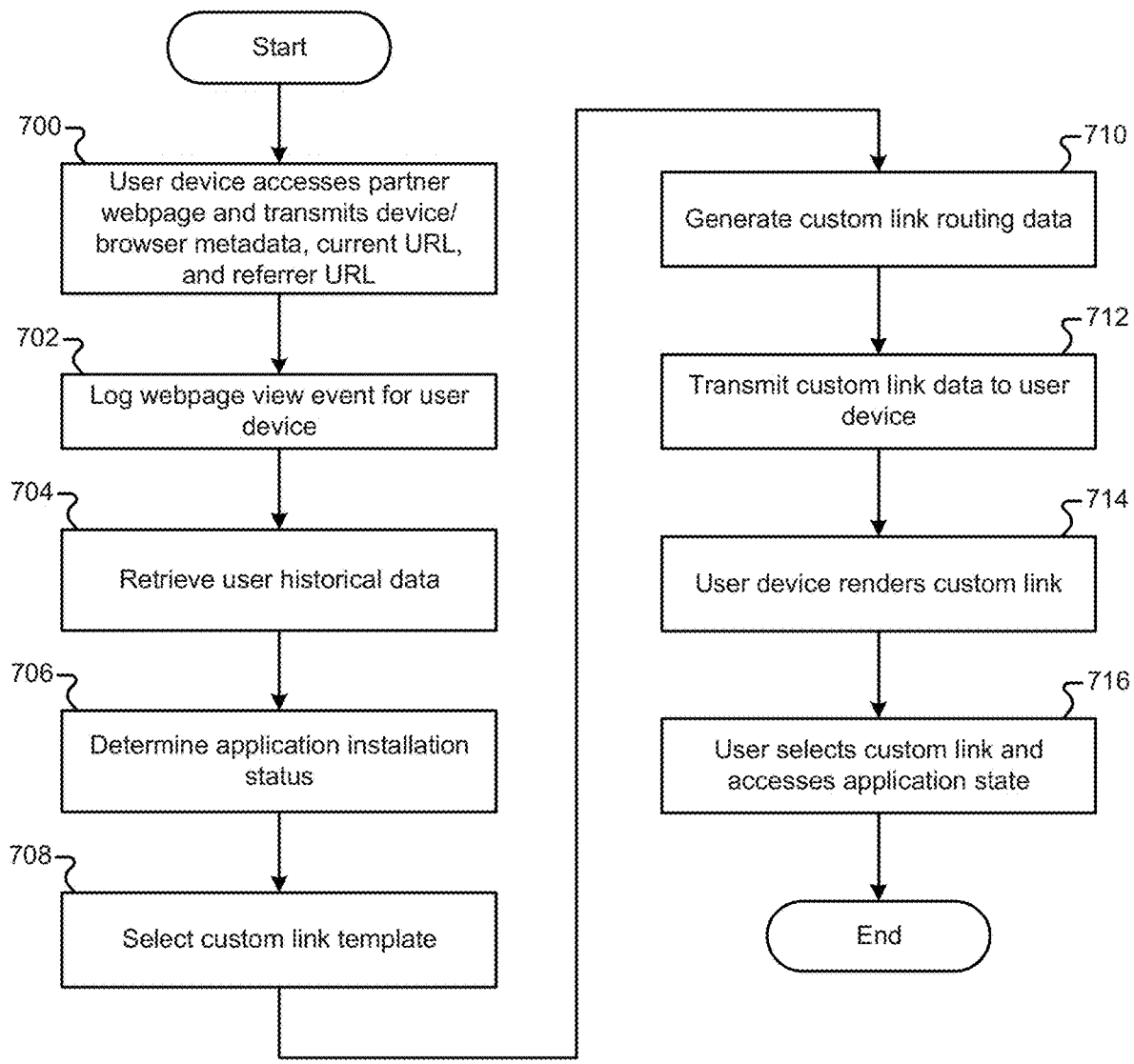
FIG. 7 illustrates a method that describes interactions between the user device and the link system.

FIG. 6 is a functional block diagram that illustrates a more detailed interaction between a user device 102 and the link system 100 along with communication between the link system 100 and the persona system 112. The link system 100 includes a template selection module 510, a custom link generation module 512, and a template data store 506. The functional block diagram of FIG. 6 is described with reference to the method of FIG. 7.

Initially, in block 700, the user device 102 accesses a partner webpage and transmits a variety of data to the link system 100 (e.g., the template selection module 510), such as device/browser metadata, the current URL, and the referral URL. In block 702, the template selection module 510 can transmit the received data to the persona system 112 for logging (e.g., as a webpage view event). For example, the persona generation module 514 may generate or update a persona indicating that the user has visited the current webpage.

In block 704, the template selection module 510 retrieves user historical data from the persona data store 508. For example, the template selection module 510 may identify a persona including a device ID that corresponds to the device ID received in the device/browser metadata. Optionally, in block 706, the template selection module 510 may determine whether the user device 102 has the corresponding application installed. For example, the template selection module 510 may determine that the application is installed if the identified persona includes an application installation event for the application (e.g., in the app-specific data). In some implementations, the template selection module 510 may transmit the installation status of the application to the user device 102 (e.g., for use in rendering the custom link). In other implementations, the link system 100 may generate custom link rendering data based on the application installation status.

In block 708, the template selection module 510 selects a custom link template to use for generating a custom link. Initially, the template selection module 510 may identify one or more sets of template rules for the partner that are satisfied. As described herein, the template rules can be based on device/browser metadata and/or current/referrer URLs. In these cases, the template selection module 510 can determine that the template rules are satisfied based on data received from the user device 102. In examples where the template rules include user history rules, the template selection module 510 can determine whether the user history rules are satisfied based on the retrieved persona (e.g., event data in the persona).

The template selection module 510 may determine that one or more sets of template rules for the partner are satisfied. If only a single set of template rules is satisfied, then the custom link may be generated from the template associated with the satisfied set of template rules. If multiple sets of template rules are satisfied, the template selection module 510 may select one of the templates for rendering based on template selection rules (e.g., weighting values and/or prioritization values).

In block 710, the custom link generation module 512 generates custom link routing data for accessing the application state corresponding to the user's current webpage. For example, the custom link generation module 512 may generate the custom link routing data and instructions based on the routing data and instructions associated with the selected template. The routing data and instructions generated by the custom link generation module 512 may vary depending on the implementation. Additionally, the extent to which the user device 102 and link system 100 are involved in routing the user device 102 to the digital distribution platform 106 and/or the application state may vary. Accordingly, a variety of techniques for accessing the digital distribution platform 106 and/or the application state are described herein.

The custom link routing data may include a variety of different types of data. In some implementations, the custom link routing data can be generated from webpage data and/or the current webpage URL. In this example, the application may use the webpage data and/or the current webpage URL to access the corresponding application state. For example, if the current webpage is directed to a specific product, the webpage data (e.g., a product ID number) and/or the current webpage URL (e.g., a product-specific portion of the URL) can be used by the application to access an application state corresponding to the specific product. In some implementations, the web browser 134 (e.g., the web module 104) may be configured to extract data from the webpage data and/or current webpage URL and access the corresponding application state. In other implementations, the web browser 134 (e.g., the web module 104) may extract data from the webpage data and/or the current webpage URL and transmit the extracted data to the link system 100 for later use in routing the application (e.g., after the application is installed) and/or determining whether template rules are satisfied. In these implementations, the application may access the routing data on the link system 100 after installation (e.g., FIG. 9). As such, the custom link routing data may be generated/used by the user device 102 and/or link system 100 to varying degrees, depending on the implementation.

In some implementations, the custom link routing data may include one or more uniform resource identifiers (URIs). For example, the custom link routing data may include one or more URIs for accessing the digital distribution platform 106 and/or corresponding application state (e.g., multiple URIs for different OSs and/or browsers). The partner may specify the URIs for accessing the digital distribution platform 106 to download the partner application. The partner may also specify URIs for accessing the application in the case the application is installed on the user device 102.

The custom link routing data may also include instructions (e.g., JavaScript) for accessing the digital distribution platform 106 and/or the corresponding application state. The instructions may be executed at the user device 102 and/or the link system 100, depending on the implementation. For example, the user device 102 may receive routing instructions that cause the user device 102 to attempt to open the application in response to user selection of the custom link. In this example, if the application is not installed, the user device 102 may access the digital distribution platform 106 according to the routing instructions. In other examples, the user device 102 may be routed by the link system 100 according to the routing instructions. For example, the link system 100 may redirect the user device 102 to the digital distribution platform 106 if the application is not installed. Additionally, the link system 100 may generate routing data according to routing instructions. The link system 100 may then transmit the routing data to the user device 102 that the application can use to access the corresponding state.

In block 712, the custom link generation module 512 transmits the custom link data to the user device 102. The custom link data may include custom link rendering data and custom link routing data that is generated based on the selected template. As described herein, the custom link rendering data may be retrieved from the template data store 506 and/or determined based on dynamic factors (e.g., geo-location/installation status). Selection of the dynamically rendered content can be performed by the custom link generation module 512 and/or the user device 102.

In block 714, the user device 102 (e.g., web browser 134) renders the custom link based on the received custom link rendering data. In block 716, in response to the user selecting the custom link, the user device 102 can access the digital distribution platform 106 and/or the application state corresponding to the current webpage using the custom link routing data.

Figure 9:
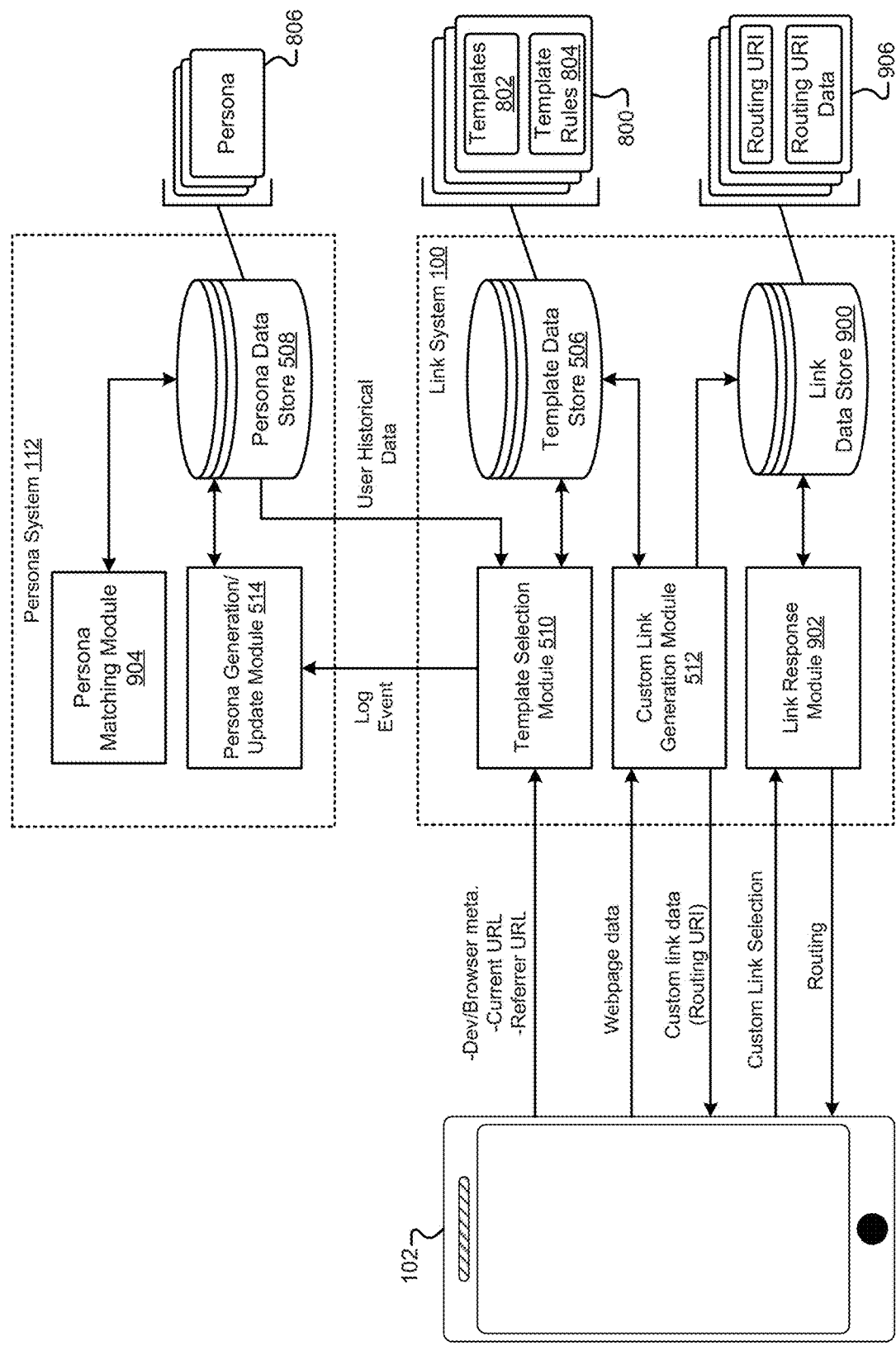
FIG. 9 is a functional block diagram that illustrates interaction between a user device and an example link system.

FIG. 9 illustrates another example link system 100 and persona system 112. The link system 100 and persona system 112 of FIG. 9 include additional components for implementing the custom link functionality of the present disclosure. Specifically, the link system 100 includes a link data store 900 and a link response module 902. The link data store 900 stores custom link routing data for routing the user device 102 to the application state. The link response module 902 handles selection of the custom link according to the routing data stored in the link data store 900. The persona system 112 includes a persona matching module 904 that matches the custom link selection event to the subsequent application open event, assuming the application was not installed when the custom link was selected.

Figure 10:
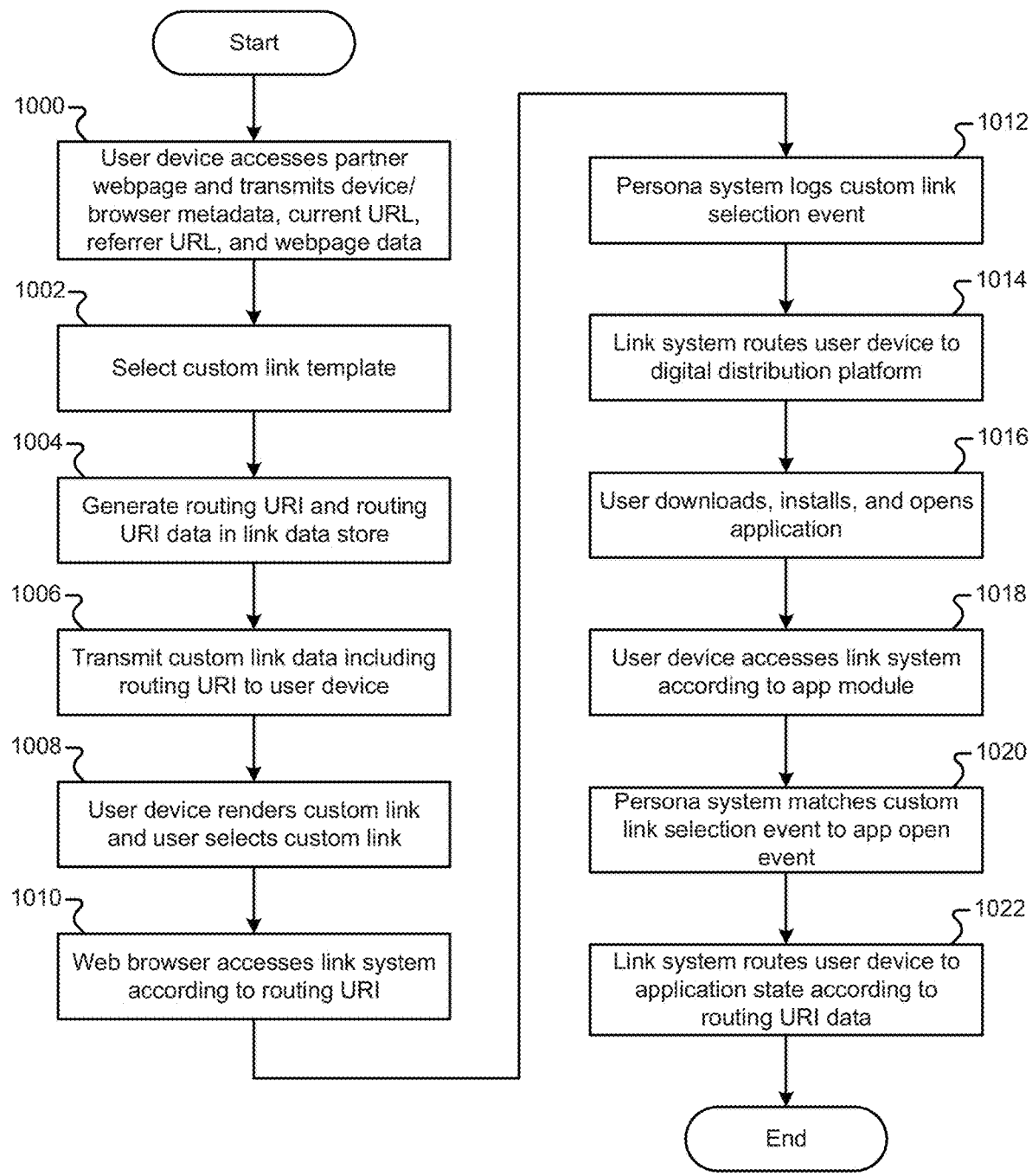
FIG. 10 illustrates a method that describes interactions between a user device and an example link system.

The link system 100 and the persona system 112 of FIG. 9 are now described with respect to the method of FIG. 10. It may be assumed that the user device 102 does not have the partner's application installed at the start of the method. Initially, in block 1000, the user device 102 accesses the partner's webpage and transmits device/browser metadata, the current URL, and the referrer URL to the link system 100. The user device 102 may also transmit extracted webpage data to the link system 100 in implementations where the partner has configured the web module 104 to extract webpage data for later use by the link system 100 for routing the user device 102.

In block 1002, the template selection module 510 selects a custom link template based on a set of satisfied template rules. In block 1004, the custom link generation module 512 generates a routing URI and associated routing URI data. The custom link generation module 512 may generate the routing URI and associated routing URI data based on any of the data received from the user device 102, such as the current URL and/or the extracted webpage data. The custom link generation module 512 stores the routing URI and the associated routing URI data as a routing data object 906 in the link data store 900 for later use in routing the user device 102 to the digital distribution platform 106 and/or the corresponding application state, in the case the user selects the custom link.

The routing URI may include a domain name (e.g., example.com or www.example.com) and a path (e.g., example.com/path_segment1/path_segment2/). The domain name and path can be used to access the link system 100. Specifically, the user device 102 (e.g., the web browser 134 and/or partner application 122) may use the routing URI to access the associated routing URI data. The user device 102 may be routed to the digital distribution platform 106 and/or the corresponding application state according to the routing URI data. In some cases, the scheme for the routing URI may be a web URL (i.e., a routing URL) using http, or another scheme, such as ftp.

The partner may specify the routing URI data that is generated for a custom template (e.g., in the routing data/instructions of the custom template data). In some implementations, the routing URI data may include instructions for routing the user device to the partner's application in the digital distribution platform 106. For example, the routing URI data may include multiple URLs for downloading the partner's application on different digital distribution platforms 106 corresponding to different operating systems. In this example, the routing URI data may also include instructions for selecting the different download URLs based on the OS specified in the device/browser metadata.

The routing data can also include data for routing the application to the application state. In some implementations, the data can be extracted from the webpage and/or the current webpage URL. For example, the partner may configure the web module 104 to extract data from the current webpage and/or current webpage URL for accessing the application state. For example, if the current webpage is directed to a specific product, the partner may configure the web module 104 to extract webpage data (e.g., a product ID number) and/or the current webpage URL (e.g., a product-specific portion of the URL) for later use by the application in accessing the application state. The partner may also configure the application module 124 to use the routing data to access the application state, as described herein.

The custom link routing data may also include instructions related to handling user selection of a custom link including the routing URI. Specifically, the instructions may cause the user device 102 to open the installed application based on the routing URI or access the link system 100 using the web browser if the application is not installed. In some implementations, the user device 102 may recognize the routing URI as being associated with the installed application and open the application in response to selection of the custom link. For example, the user device 102 (e.g., the OS) may recognize the routing URI (e.g., the domain and/or path) as being a URI that is handled by an application installed on the user device 102. In this case, the user device 102 (e.g., the OS 132) may launch the application and pass the routing URI to the launched application. In this case, the application may transmit the routing URI to the link system 100. Examples of user devices and OSs that may recognize link formats and launch applications from selected links may include 1) devices running the IOS® operating system that recognize Universal Links and 2) devices running the ANDROID® OS operating system that recognize Android App Links.

In some implementations, the routing URI data may include link analytics data. Link analytics data may include data used by the partner to track the performance of the custom link, such as how many times the custom link is selected and where the custom link is being selected. For example, the analytics data can include tags specified by the partner that indicate a campaign name (e.g., an advertising campaign name), an application name, and/or a channel (e.g., website) with which the custom link is associated (e.g. a website including the custom link).

Referring back to the method of FIG. 10, in block 1006, the custom link generation module 512 transmits the custom link rendering data and the custom link routing data including the routing URI to the user device 102. In block 1008, the user device 102 renders the custom link and the user selects the custom link. Since the partner application is not installed, the web browser 134 handles selection of the custom link (e.g., according to the routing instructions). Accordingly, in block 1010, the user device 102 (e.g., the web browser 134) accesses the link system 100 according to the routing URI. In block 1012, the persona system 112 logs the custom link selection event so that a subsequent application open event can be matched to the custom link selection, in the case the user installs and opens the application.

The link system 100 (e.g., the link response module 902) receives the routing URI and associated device/browser metadata. The link response module 902 accesses the link data store 900 to retrieve routing URI data associated with the routing URI. In block 1014, the link response module 902 routes the user device 102 to the digital distribution platform 106 for downloading the partner's application corresponding to the user device's OS and/or browser type. For example, the user device 102 may be routed via a web browser redirect.

In block 1016, the user downloads, installs, and opens the application. In block 1018, the user device 102 accesses the link system 100 (e.g., the link response module 902) upon opening, according to the application module 124. Specifically, the partner may configure the application module 124 to send an application open event to the link system 100 upon each opening. The application open event may include device/browser metadata.

In block 1020, the persona system 112 (e.g., the persona matching module 904) may match the custom link selection event to the application open event using a variety of different techniques. In some cases, the persona data store 508 may include a single persona having the web ID associated with the custom link selection event and the device ID associated with the application open event. In this case, the persona matching module 904 may determine that the custom link selection event and the application open event are associated with the same user device. In other cases, the persona matching module 904 may determine that the custom link selection event and the application open event are associated with the same user device based on matches between the device/browser metadata associated with the two separate events.

In block 1022, after determining that the custom link selection event and the application open event originated from the same user device, the link response module 902 routes the application to the corresponding application state. For example, the link response module 902 may transmit routing URI data to the user device 102, which may then be used by the application module 124 to access the corresponding application state. Had the application been installed in the method of FIG. 10 when the custom link was selected by the user, the user device 102 (e.g., according to the application module 124) would launch the installed application using the routing URI. The user device 102 (e.g., according to the application module 124) would then access the routing URI data associated with the routing URI and subsequently access the corresponding application state.

As described herein, the persona matching module 904 may perform matching of personas based on comparisons of matching data included in the personas, such as IP address, device OS name/version, device type, screen resolution, browser type, and user identification data. In one specific example, the persona matching module 904 may determine that personas match when the personas include the same IP address, device OS name/version, device type, screen resolution, and/or browser type. If the two personas match, the persona matching module may modify one or more of the personas (e.g., by combining personas).

The persona matching module 904 may refrain from matching personas in the case where the personas include inconsistent data (e.g., contradictory data). For example, the persona matching module 904 may refrain from matching personas if the IP addresses, the device OSs, device types, or other device/browser metadata is inconsistent (e.g., contradictory), such that the data was not likely generated by the same user device. In some cases, the device/browser metadata generated by the same user device may be different (e.g., not exactly the same). For example, the device/browser metadata generated by the application module 124 may be different than the device/browser metadata generated by the web module 104. Some examples of differing device/browser metadata include variations in the reported device OS name and device type. The persona matching module 904 may learn the variations between device/browser metadata and account for the variations when performing matching operations.

A period of time may pass between user selection of the custom link and the initial opening of the newly installed application. The persona matching module 904 may include a time window value that indicates the maximum allowable duration of time between selection of the custom link and the opening of the newly installed application. In this example, the persona matching module 904 may select personas for matching based on the time window in which the personas were generated (e.g., a time window in which the event data was received). For example, after receiving event data and generating a new persona, the persona matching module 904 may select one or more existing personas to match with the new persona based on the time the existing personas were created. In this example, the persona matching module 904 may define a time window (e.g., in minutes, hours, days, etc.) and select existing personas that were generated within the time window relative to the new persona. In a more specific example, if the persona matching module 904 is configured to match personas within a two hour time window, the persona matching module 904 may select personas for matching with a new persona if the existing personas are timestamped less than (or equal to) two hours from the time the new persona was timestamped. The partner may configure the time window value.

In some implementations, the persona matching module 904 may determine a matching score for two personas that indicates the likelihood that the two personas are associated with the same user device. In implementations where the persona matching module 904 determines a matching score for two personas, the persona matching module 904 may use a matching score threshold value to determine whether two personas match. For example, the persona matching module 904 may initially determine a matching score for two personas. Then, the persona matching module 904 may determine whether the matching score is greater than a threshold value. The persona matching module 904 may determine that the two personas match in cases where the matching score is greater than, or equal to, the threshold value. The partner may set the matching score threshold.

In some implementations, the persona matching module 904 may determine the matching score between two personas based on the number of potential additional persona matches. For example, in cases where multiple personas include similar device/browser metadata, a plurality of possible matches between the personas may be possible. In these cases, the matching score may reflect the ambiguity present in persona matching. For example, a matching score may be lower for scenarios where a greater number of matches are possible. In one specific example, a matching score may be inversely proportional to the number of possible matches (e.g., 1 divided by the total number of possible matches). In general, more specific matching data (e.g., more specific OS name/version, device type) may yield less ambiguity when matching personas.

In some implementations, the persona matching module 904 may select personas for matching based on IP addresses associated with the personas. For example, after generating a new persona, the persona matching module 904 may select one or more existing personas to match with the new persona based on the IP addresses associated with the new persona and the existing personas. In this example, the persona matching module 904 may select one or more personas from the existing personas for matching if the existing personas include the same IP address as the new persona.

In some implementations, the persona matching module 904 may determine whether two personas match based on the frequency with which the IP addresses are used. For example, the persona matching module 904 may refrain from matching personas if there are too many personas associated with a single IP address since high traffic areas can result in similar devices/browsers (e.g., false matches). In some cases, the persona matching module 904 may compute the matching score based on the number of incidents of a single IP address (e.g., lower the score for a greater number of IP addresses). In some implementations, the persona matching module 904 may store a value indicating the traffic level associated with an IP address, such as a count of IP addresses with incoming events and/or a count of IP addresses over time (e.g., a rate of IP addresses). In other implementations, the traffic level associated with an IP address can be determined on a per-batch basis (e.g., when persona matching is done on a per batch basis).

Figure 11:
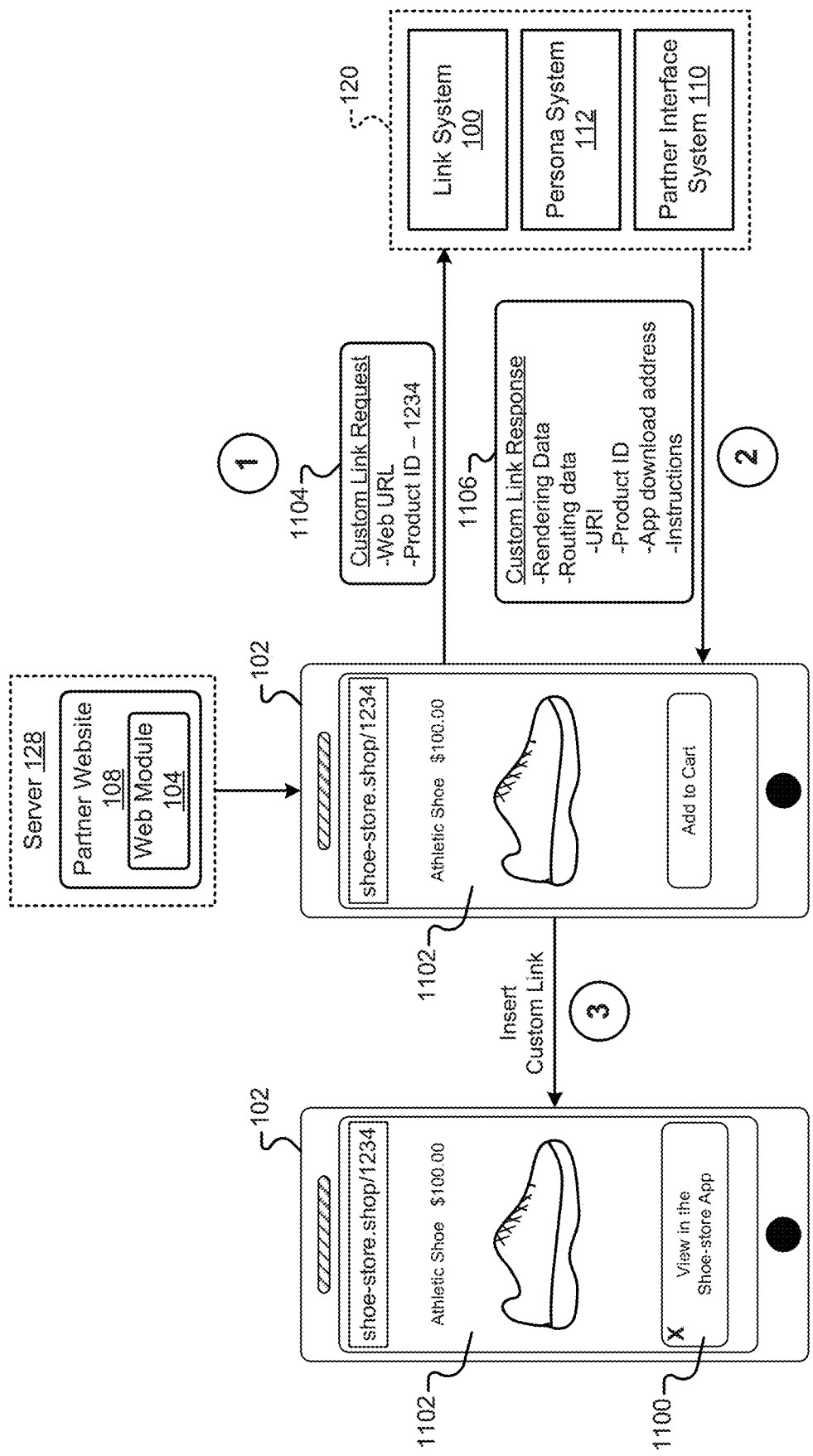
FIG. 11 illustrates an example of generating a custom link and routing the user after selection of the custom link.

FIG. 11 illustrates another example of generating a custom link 1100 and routing the user device 102. In FIG. 11, the user has accessed a partner website that sells shoes. The partner website domain is shoe-store.shop. In FIG. 11, the current webpage 1102 is shoe-store.shop/1234 that displays an athletic shoe with a purchase price of $100.00. The product ID used by the partner for the displayed athletic shoe is 1234.

In FIG. 11, it can be assumed that the web module 104 is implemented on the partner website 108 and the shoe-store partner application includes an application module 124 that can provide linking functionality after installation. Furthermore, it can be assumed that the partner has configured a custom link to be shown for the currently viewed webpage.

Initially, in FIG. 11, the user accesses the athletic shoe webpage 1102 using a web browser application. The web module 104 associated with the webpage 1102 acquires the web URL and webpage data for a custom link request 1104 and then transmits the custom link request 1104 to the link system 100 (as indicated at 1). The custom link request 1104 may be an HTTP request in some examples. Although the custom link request 1104 is described as a single request, the web module 104 may make several calls including a variety of data to different endpoints in the link system 100 and persona system 112. In FIG. 11, the custom link request 1104 includes the webpage URL and the product ID of the athletic shoe.

In FIG. 11, it can be assumed that the custom link request 1104 satisfies a set of template rules for displaying a custom link. Accordingly, the link system 100 transmits a custom link response 1106 to the user device 102 that includes custom link rendering data and custom link routing data (as indicated at 2). The rendering data can include text and images. For example, the custom link 1100 includes a GUI element for closing the custom link 1100 (e.g., an "x" graphic) along with the text "View in the Shoe-store App."

The custom link routing data may include a URI, product ID, an application download address, and instructions. The URI and/or product ID can be used by the shoe-store partner application to access the application state that corresponds to the viewed webpage 1102. The application download address can be used (e.g., by the web browser) to acquire the shoe-store application on a digital distribution platform 106, assuming the shoe-store application is not installed on the user device 102.

The user device 102 renders the custom link 1100 (as indicated at 3). Upon selection of the custom link 1100 by the user, the user device 102 (e.g., the web browser and/or OS) may use the instructions to access the application state using the URI and/or product ID if the application is installed. For example, selecting the custom link 1100 may cause the shoe-store application to launch and access the application state according to the URI and/or the product ID. Otherwise, if the application is not installed (e.g., fails to launch according to the instructions), the user device 102 (e.g., the web browser) may access the digital distribution platform 106 to download the shoe-store application using the application download address. The shoe-store application may then access the application state upon opening the application, as described herein. Although the custom link routing data used to route the user device 102 can be sent from the link system 100 to the user device 102, in some implementations, some of the routing data (e.g., a portion of URL and/or product ID) used can be generated and used client-side (e.g., by the web module 104) to route the user device 102.

The partner template data objects 800, persona data objects 806, and routing data objects 906 described herein represent data stored in the template data store 506, persona data store 508, and the link data store 900, respectively. The data stores may include a variety of different data structures that are used to implement the data. For example, the partner template data objects 800, persona data objects 806, and routing data objects 906 may be implemented using one or more different data structures.

Modules and data stores included in the systems (e.g., the link system 100, the persona system 112, and the partner interface system 110) represent features that may be included in the systems of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component (e.g., main memory and/or a storage device) may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

Memory components may include (e.g., store) data described herein. For example, the memory components may include the data included in the data stores. Memory components may also include instructions that may be executed by one or more processing units. For example, memory may include computer-readable instructions that, when executed by one or more processing units, cause the one or more processing units to perform the various functions attributed to the modules and data stores described herein.

The I/O components may refer to electronic hardware and software that provide communication with a variety of different devices. For example, the I/O components may provide communication between other devices and the one or more processing units and memory components. In some examples, the I/O components may be configured to communicate with a computer network. For example, the I/O components may be configured to exchange data over a computer network using a variety of different physical connections, wireless connections, and protocols. The I/O components may include, but are not limited to, network interface components (e.g., a network interface controller), repeaters, network bridges, network switches, routers, and firewalls. In some examples, the I/O components may include hardware and software that is configured to communicate with various human interface devices, including, but not limited to, display screens, keyboards, pointer devices (e.g., a mouse), touchscreens, speakers, and microphones. In some examples, the I/O components may include hardware and software that is configured to communicate with additional devices, such as external memory (e.g., external HDDs).

In some implementations, the systems may include one or more computing devices that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the systems may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices of the systems may be configured to communicate with the network 118 of FIG. 1. The one or more computing devices of the systems may also be configured to communicate with one another (e.g., via a computer network). In some examples, the one or more computing devices of the systems may include one or more server computing devices configured to communicate with user devices. The one or more computing devices may reside within a single machine at a single geographic location in some examples. In other examples, the one or more computing devices may reside within multiple machines at a single geographic location. In still other examples, the one or more computing devices of the systems may be distributed across a number of geographic locations.

What is claimed is:

1. A method comprising:
receiving, at a computing device, a custom link request from a user device accessing a webpage, the custom link request including a uniform resource locator (URL) of the webpage and a device identifier that uniquely identifies the user device;
retrieving, at the computing device, a list of application events associated with the user device based on the device identifier, wherein each of the application events identifies a user action taken on an application installed on the user device;
retrieving, at the computing device, sets of template rules, wherein each set of template rules indicates one or more application events that satisfy the set of template rules, wherein each set of template rules indicates one or more URLs that satisfy the set of template rules, and wherein each set of template rules is associated with a custom link template that includes custom link rendering data for rendering a custom link on the user device;
identifying, at the computing device, a set of template rules that is satisfied by the received URL and the retrieved list of application events associated with the user device;
transmitting, from the computing device, custom link rendering data associated with the identified set of template rules to the user device; and
transmitting, from the computing device, custom link routing data to the user device, wherein the custom link routing data is configured to route the user device to an application page of the application in response to user selection of the custom link rendered from the transmitted custom link rendering data.

2. The method of claim 1, wherein the one or more application events include an application installation event that indicates the application was installed on the user device.

3. The method of claim 1, wherein the one or more application events include an application reinstallation event that indicates the application was installed more than once on the user device.

4. The method of claim 1, wherein the one or more application events include an application open event that indicates when the application installed on the user device was opened.

5. The method of claim 1, wherein the one or more application events include an application page view event that indicates when a user viewed a specific application page in the application.

6. The method of claim 1, wherein the one or more application events include an application commerce event, wherein the application commerce event includes at least one of adding an item to a shopping cart in the application and completing a purchase using the application.

7. The method of claim 1, wherein one of the sets of template rules is satisfied based on the occurrence of an application event within a specified period of time.

8. The method of claim 1, wherein one of the sets of template rules is satisfied based on the absence of a specific application event within a specified period of time.

9. The method of claim 1, wherein one of the sets of template rules is satisfied based on an occurrence of a specified number of application events.

10. The method of claim 9, wherein the one of the sets of template rules is satisfied based on the occurrence of the specified number of application events within a specified period of time.

11. The method of claim 1, wherein the device identifier is a first device identifier, wherein the first device identifier is associated with a web browser application installed on the user device, and wherein the method further comprises:
receiving, at the computing device, a second device identifier that identifies the application installed on the user device;
in response to receiving the custom link request, determining that the first device identifier and the second device identifier are associated with the user device; and
retrieving the list of application events associated with the user device in response to determining that the first device identifier and the second device identifier are associated with the user device.

12. A system comprising:
one or more storage devices configured to store computer-readable instructions; and
one or more processing units configured to execute the computer-readable instructions, wherein the computer-readable instructions cause the one or more processing units to:
receive a custom link request from a user device accessing a webpage, the custom link request including a uniform resource locator (URL) of the webpage and a device identifier that uniquely identifies the user device;
retrieve a list of application events associated with the user device based on the device identifier, wherein each of the application events identifies a user action taken on an application installed on the user device;

retrieve sets of template rules, wherein each set of template rules indicates one or more application events that satisfy the set of template rules, wherein each set of template rules indicates one or more URLs that satisfy the set of template rules, and wherein each set of template rules is associated with a custom link template that includes custom link rendering data for rendering a custom link on the user device;

identify a set of template rules that is satisfied by the received URL and the retrieved list of application events associated with the user device;

transmit custom link rendering data associated with the identified set of template rules to the user device; and transmit custom link routing data to the user device, wherein the custom link routing data is configured to route the user device to an application page of the application in response to user selection of the custom link rendered from the transmitted custom link rendering data.

13. The system of claim 12, wherein the one or more application events include an application installation event that indicates the application was installed on the user device.

14. The system of claim 12, wherein the one or more application events include an application reinstallation event that indicates the application was installed more than once on the user device.

15. The system of claim 12, wherein the one or more application events include an application open event that indicates when the application installed on the user device was opened.

16. The system of claim 12, wherein the one or more application events include an application page view event that indicates when a user viewed a specific application page in the application.

17. The system of claim 12, wherein the one or more application events include an application commerce event, wherein the application commerce event includes at least one of adding an item to a shopping cart in the application and completing a purchase using the application.

18. The system of claim 12, wherein one of the sets of template rules is satisfied based on the occurrence of an application event within a specified period of time.

19. The system of claim 12, wherein one of the sets of template rules is satisfied based on the absence of a specific application event within a specified period of time.

20. The system of claim 12, wherein one of the sets of template rules is satisfied based on an occurrence of a specified number of application events.

21. The system of claim 20, wherein the one of the sets of template rules is satisfied based on the occurrence of the specified number of application events within a specified period of time.

22. The system of claim 12, wherein the device identifier is a first device identifier, wherein the first device identifier is associated with a web browser application installed on the user device, and wherein the computer-readable instructions cause the one or more processing units to:

receive a second device identifier that identifies the application installed on the user device;

in response to receiving the custom link request, determine that the first device identifier and the second device identifier are associated with the user device; and retrieve the list of application events associated with the user device in response to determining that the first device identifier and the second device identifier are associated with the user device.

* * * * *